United States Patent [19]

Suver

[11] Patent Number: 6,016,497
[45] Date of Patent: Jan. 18, 2000

[54] METHODS AND SYSTEM FOR STORING AND ACCESSING EMBEDDED INFORMATION IN OBJECT-RELATIONAL DATABASES

[75] Inventor: Christopher Allen Suver, Seattle, Wash.

[73] Assignee: Microsoft Corporation, Redmond, Wash.

[21] Appl. No.: 08/998,334

[22] Filed: Dec. 24, 1997

[51] Int. Cl.⁷ .................................................. G06F 17/30
[52] U.S. Cl. .................. 707/103; 707/2; 707/4; 707/101; 707/102
[58] Field of Search .................. 707/103, 101, 707/4, 10, 3, 2, 202, 204, 102; 345/346, 356; 364/246, 282; 706/45, 47, 60

[56] References Cited

U.S. PATENT DOCUMENTS

| | | | |
|---|---|---|---|
| 5,713,020 | 1/1998 | Reiter et al. | 707/102 |
| 5,822,747 | 10/1998 | Graefe et al. | 707/2 |
| 5,832,481 | 11/1998 | Sheffield | 707/4 |
| 5,850,544 | 12/1998 | Parvathaneny et al. | 707/101 |
| 5,873,083 | 2/1999 | Jones et al. | 707/4 |

*Primary Examiner*—Wayne Amsbury
*Assistant Examiner*—Thu-Thao Havan
*Attorney, Agent, or Firm*—Jones & Askew, LLP

[57] ABSTRACT

A system and computer-implemented methods for accessing and storing information embedded in a column of a database row, especially useful for complex data, that is, data which is logically multi-valued or hierarchical. Embedded data is not stored in a separate table but is stored directly in a complex column comprising embedded data a subtables. A row of data is physically stored in a tagged, variable-length object-relational format, which allows the data to be stored as atomic data values or embedded as collections of data values, data structures, or collections of data structures. The structures can have further levels of embedding, i.e. more collections and/or structures. Embedded data may further include typed data embedded in multiple tables and columns. The query language for accessing the data includes a series of extensions that provide additional access paths to the data. Searches can access data within tables and subtables, and can access data by user defined type (UDT) in a single table or across multiple tables.

39 Claims, 14 Drawing Sheets

301 — CUSTOMERS

312a, 312b, 312c, 312d

310

| CUSTLD | NAME | CITY | STATE | ZIP CODE |
|---|---|---|---|---|
| 01 | SUVER | SEATTLE | WA | 12345 |
| 11 | GATES | REDMOND | WA | 12346 |
| ⋮ | ⋮ | ⋮ | ⋮ | ⋮ |

302 — CUSTADDRESS

| ADDRESSLD | CUSTLD | NAME | ADDRESS |
|---|---|---|---|
| 02 | 01 | SUVER | 3000 MICROSOFT LANE |
| 12 | 01 | SUVER | 405 CASCADE STREET N.W. |
| ⋮ | ⋮ | ⋮ | ⋮ |

303 — CUSTPHONES

| PHONELD | CUSTLD | NAME | PHONENUMBER |
|---|---|---|---|
| 03 | 01 | WORK | 123-456-7890 |
| 13 | 01 | HOME 1 | 123-555-9999 |
| 23 | 01 | HOME 2 | 123-556-7795 |
| ⋮ | ⋮ | ⋮ | ⋮ |

CUSTOMERS

| OBJID | NAME | CITY | STATE | ZIP CODE | ADDRESS | PHONES | |
|---|---|---|---|---|---|---|---|
| | | | | | | PHONE TYPE | PHONE NUMBER |
| 12.1E | SUVER | SEATTLE | WA | 12345 | 405 CASCADE STREET N.W. | WORK | 123-456-7890 |
| | | | | | | HOME | 123-555-9999 |
| | | | | | 3000 MICROSOFT LANE | | 123-556-7795 |
| ..... | ..... | ..... | ..... | ..... | ..... | ..... | ..... |

Fig. 7

ORDERS

| OBJID | CUST | ORDER DATE | SHIP DATE | DETAILS | | |
|---|---|---|---|---|---|---|
| | | | | PART | QTY ORD | QTY SHIPPED |
| 13.1A | 12.1E | 01-23-1997 | 10-20-1997 | 14.1C | 500,000 | 500,000 |
| ... | ... | ... | ... | ... | | |

PARTS 801

| OBJ LD | PART NAME | QTY ON HAND | QTY ON ORDER | PRICE |
|---|---|---|---|---|
| 14.1.E | WIDGETS | 2000000 | 500000 | $00.75 |
| ⋮ | ⋮ | ⋮ | ⋮ | ⋮ |

901

| TABLE/TYPE NAME | TABLE OR UDT? | DATABASE DICTIONARY ||||
|---|---|---|---|---|---|
| | | COLUMN INFORMATION ||||
| | | COLUMN NAME | TYPE | COLUMN ID | COLLECTION? |
| CUSTOMERS | TABLE | NAME | TEXT | 1 | NO |
| | | ADDRESS | TEXT | 2 | YES |
| | | CITY | TEXT | 3 | NO |
| | | STATE | TEXT | 4 | NO |
| | | ZIP CODE | NUMBER | 5 | NO |
| | | PHONES | PHONE | 6 | YES |
| ORDERS | TABLE | CUST | REFTO | 1 | NO |
| | | ORDER DATE | NUMBER | 2 | NO |
| | | SHIP DATE | NUMBER | 3 | NO |
| | | DETAILS | DETAIL | 4 | YES |
| PARTS | TABLE | PART NAME | TEXT | 1 | NO |
| | | QTY ON HAND | NUMBER | 3 | NO |
| | | QTY ON ORDER | NUMBER | 4 | NO |
| | | PRICE | CURRENCY | 2 | NO |
| PHONE | UDT | PHONE TYPE | TEXT | 1 | NO |
| | | | TEXT | 2 | YES |
| DETAIL | UDT | PART | REFTO | 1 | NO |
| | | QTY ORD | NUMBER | 2 | NO |
| | | | NUMBER | 3 | NO |
| SUPPLIERS | TABLE | TYPE STORE | TEXT | 1 | NO |
| | | PHONES | PHONE | 2 | YES |

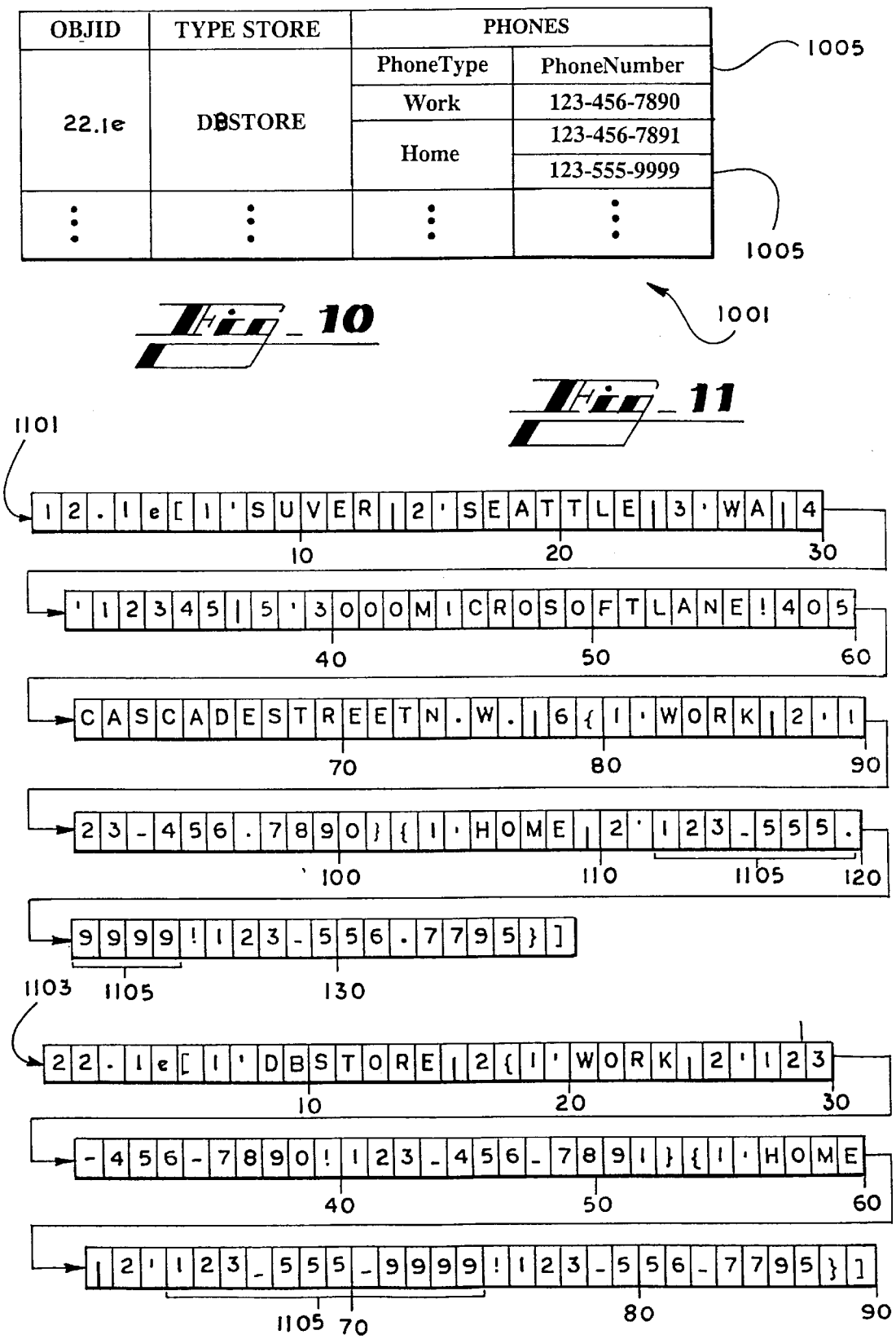

Fig_15

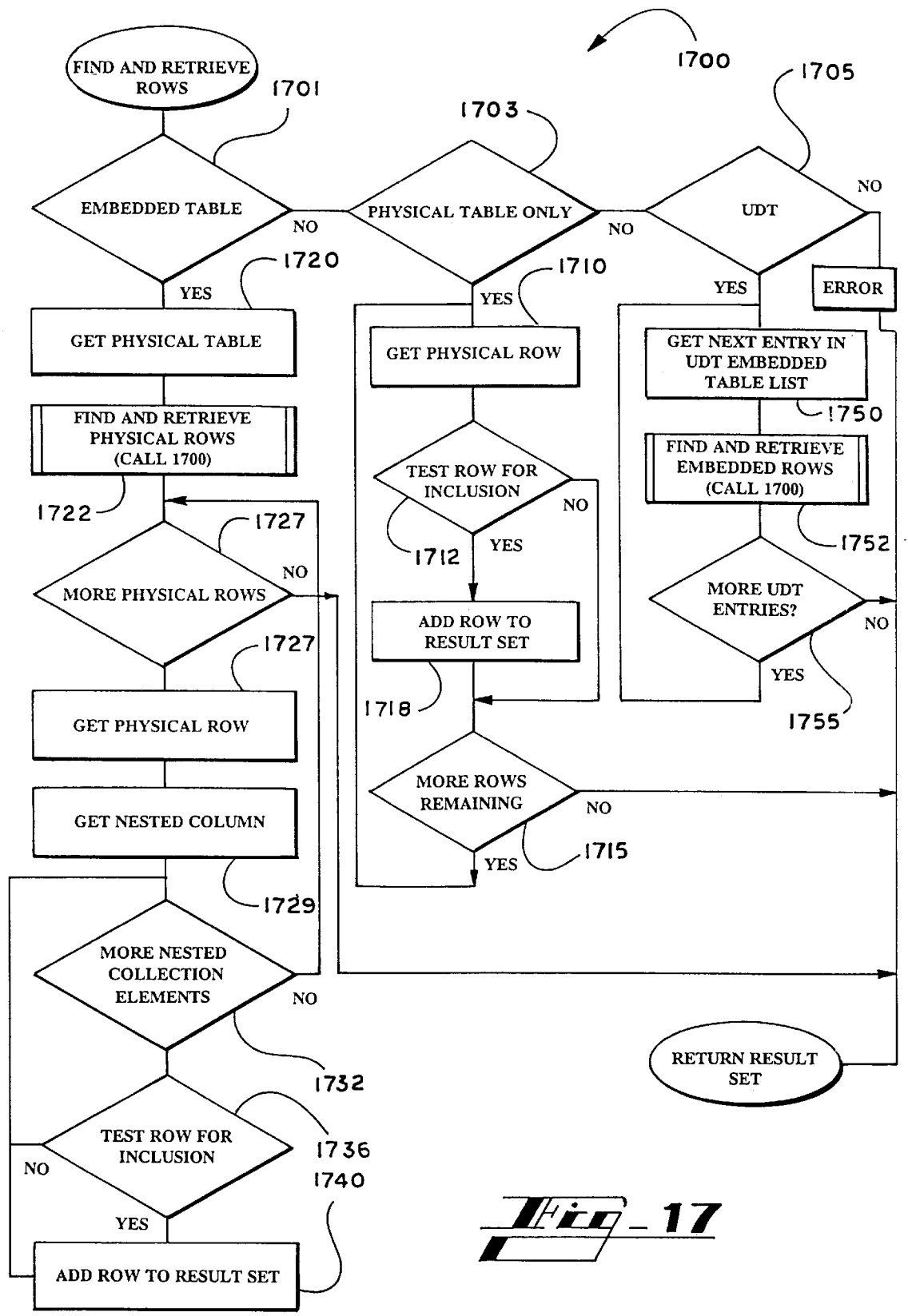

METHODS AND SYSTEM FOR STORING AND ACCESSING EMBEDDED INFORMATION IN OBJECT-RELATIONAL DATABASES

TECHNICAL FIELD

The present invention relates generally to the field of computer database systems, and relates more particularly to storing and accessing embedded information in object-relational databases that allow information to be manipulated as virtual tables.

BACKGROUND OF THE INVENTION

Since the 1980's, the relational database model has been the standard for virtually all commercial computer database applications. Broadly, a relational model views a database as a collection of atomic data values or elements stored in a plurality of two-dimensional tables. Each atomic value is stored in a single column per row of a relational database table. There is no elegant provision in a conventional relational database for "complex" data, that is, data which logically is multiple or hierarchical, except by adding linked tables.

Typical prior art relational databases are restricted in that a given value in a column of a database row can contain only a single atomic value (atomic in that sense that the data is a single number or text string). When the data being stored is not a single value, such as plural telephone numbers for a person, a new separate table of rows must be created to store the multiple values, one per row. For example, if a database contains a column for "Name" and a column for "Telephone", it is not possible to store plural telephone numbers associated with the name in a single column in a single table. Rather, a separate entry that duplicates the name is required for both addresses, or a separate table must be provided that stores the two addresses in two separate rows.

The physical data fields of a relational databases are typically of a fixed length, with a predetermined amount of space being reserved for each individual data element. Also, most relational database management systems (RDBMS) or relational database engines do not have the ability to recognize new data types that are not known by the system. Therefore, the rigid structure of the relational database model does not allow such a system to handle complex, hierarchical data structures.

Still, the rigidity of the relational database model allows the RDBMS to handle large amounts of data through relatively simple algebraic operations. Principles of relational algebra are embodied in higher-level languages such as Structured Query Language (SQL) and Quel, which provide standard syntax for instructing a RDBMS to access desired data elements from a certain table or to join tables to express the relationships among data elements. Through SQL and similar query languages, the user of a relational database has the ability to process complex queries on a logical level, i.e. without knowing anything about the physical storage structure of the database. However, in most current relational systems the physical and logical structures closely correspond.

More recently, object-oriented database models have emerged. The object-oriented database model is based on the tight integration of computer code and data, flexible data types, hierarchical and embedded data, and references. Typically, object-oriented databases store complex data objects in variable-length data fields. Variable length data fields are used so that the data objects do not have to be decomposed into atomic elements. Although object-oriented databases have the innate ability to store complex and hierarchical data, the complexity of access to the embedded data has impeded the development of simple, easy to use SQL-type access mechanisms.

An object-relational database is a hybrid of the standard relational database model and the emerging object-oriented database model. An object-relational database attempts to combine the benefits and eliminate the drawbacks of both the relational model and the object-oriented model. In other words, an object-relational database attempts to store complex data objects in such a way that they may be accessed through relational methodologies such as SQL queries and table analogies, while preserving the real-world aspects of object-oriented modeling.

One method of creating an object-relational database is to build an object-oriented application program around the relational model. Each object in the application's code needs to know how to store and retrieve its associated data elements from the relational database. This leads to significant redundancy because each object class must include details of the relational database implementation. Furthermore, object-oriented data structures do not map directly to relational database tables, requiring complicated code to bridge the gaps rather than SQL-type queries.

It will thus be appreciated that a particular problem with conventional relational databases and prior attempts to construct object-relational databases is loss of flexibility and data access. When the capabilities of a conventional relational database are extended to include non-relational data, especially objects that have been constructed in an object model, the flexibility of the relational system to access the data is lost. In present object-oriented database systems, access to complex data requires iteration through nested columns of data. Rather than utilizing conventional SQL-type queries, the user of the database must construct algorithms to access the nested information, which is time consuming and awkward.

As a result, prior art object-relational database systems lack powerful query capabilities that make relational databases good tools. Users are forced to choose between flexible query systems or fast and direct access to data.

Accordingly, there is a need for an improved database structure that allows for storing and access of embedded complex information in an object-relational manner, so as to employ the benefits of both the relational data modeling and object-oriented data modeling, without being encumbered by the significant limitations of each approach when it comes to complex data.

SUMMARY OF THE INVENTION

The present invention provides a system and methods for storing and accessing embedded information in object-relational databases. The invention is especially useful for complex data, that is, data which is logically multi-valued or hierarchical. The solution to the problem of accessing complex data in prior object-relational and conventional relational databases is overcome by storing the information in a object-relational format with a variable length record, with the information embedded in a hierarchical manner separated by "tags" or column delimiters.

The invention further involves adding a series of capabilities to the query language of the database with logical extensions that provide additional data access paths to the complex data. These additions to the query language make access to complex data as simple and powerful as in a relational database. As a result, database users can take advantage of the superior data modeling features provided in relational databases without giving up the query and access capability that make databases (especially relational databases) useful tools.

The present invention provides methods implemented as computer programs stored on computer readable media that allow access to information embedded in a column of a database row in a manner similar to that of accessing the same data as if it had been stored in a separate row. Typical prior art relational databases are restricted in that a given value in a column of a database row can contain only a single atomic value (atomic in that sense that the data is a single number or text string). When the data being stored is not a single value, such as plural telephone numbers for a person, a new separate table of rows must be created to store the multiple values, one per row.

In the present invention, there is no restriction that information in columns be atomic. Rather, embedded data is not stored in a separate table, but is stored directly in a complex column comprising embedded data. The embedded data can be collections of data items, structures, or collections of structures. The structures can have further levels of embedded data (more collections and/or structures).

The query language for accessing the data includes a series of extensions that provide additional access paths to the data. These additional access paths and query constructs allow the ease of access of a conventional relational database and query language, while providing improved performance and ease of definition and some cases. The extensions to the query language provided in the present invention treat a table from which data is extracted as a logical entity, i.e. a "virtual table", rather than the physical one actually storing the data, and further treats (or presents) the embedded data values as tables themselves. This allows queries to be issued that are identical whether the data is embedded or separate. By allowing embedded data to be treated as a virtual table, a database constructed in accordance with the present invention can still provide the same query capability as is found in conventional relational systems.

The present invention may be implemented as a database engine used in association with a database computer software program. According to the invention, a database computer software program may be configured to provide the tagged, variable-length object-relational physical data storage model for storing the actual data elements. This particular data model allows data to be embedded as atomic values, as collections of data values, as data structures, or as collections of data structures. All of such mechanisms can be employed to embed data within the column.

The present invention further allows embedded data to be accessed by querying against the embedded data as a table. As mentioned, embedded data may comprise hierarchically nested column values. Embedded data may further include typed data embedded in multiple tables and columns. In a traditional relational database system, such data would need to be stored in a separate table. In the present invention, such data may be nested. The modifications to the query language provided in the present invention allow full access to the embedded data by introducing synthetic table names to represent the embedded data.

At least two additional access paths to the data are provided, relative to conventional relational database systems. One access path allows data to be queried by providing a table name and identifier for accessing a particular data element within a column in a table name. For example, an embedded collection may be directly accessed by providing the name of a table and the name of the collection in the form of "Table.Item" where Table is the name of the logical table and Item is the name of the column in the table that is the collection of data items.

Another access path is provided through the type of data item. The present invention supports user defined types (UDTs), which permit a user to provide typing information for the data. This permits the formulation of queries that provide multiple tables for storing data of similar types and retrieving data of the specified type from the multiple tables. If a query in this case is executed against a logical table consisting of the data items, although the data items are themselves stored in separate physical tables, the data is readily retrieved.

Both a single table access path and a multiple access path through data typing are valuable to database users in different circumstances. A modifier on the type name in specified tables allow the database engine and users to limit the tables in which values are accessed.

Thus it is an object of the present invention to provide logical extensions to database systems with query systems that facilitate data access to complex data in extended object-relational database.

It is another object of the present invention to provide methods and systems for managing non-relational data such as objects in a database without losing the power to query the database that is provided in more traditional relational database systems.

It is another object of the present invention to provide a more intuitive query system for accessing complex embedded data in a database system.

It is another object of the invention to provide methods and a system for storing and accessing data comprising embedded collections, structures, and collections of structures.

Other objects, features, and advantages of the present invention will become apparent upon reading the following specification, when taken in conjunction with the drawings and the appended claims.

BRIEF DESCRIPTION OF THE DRAWINGS

FIG. 3 provides example of relational tables that might be created for an exemplary database application using a prior art relational database approach.

FIG. 6 illustrates a logical table with embedded collections and embedded structures corresponding to the Customers table in the example of FIG. 4.

FIG. 7 illustrates a logical table with an embedded structures corresponding to the Orders table in the example of FIG. 4.

FIG. 8 illustrates a logical table corresponding to the Parts table in the example of FIG. 4.

FIG. 9 illustrates a dictionary provided in the implementation of the preferred embodiment of the present invention.

FIG. 10 illustrates a logical table corresponding to the Suppliers table in the example of FIG. 4.

FIG. 11 shows two variable-length rows employed in the exemplary database of FIG. 4, one from the Customers table and one from the Suppliers table, for illustrating a query on a type.

FIG. 17 is a logic flow diagram of a routine within the method described in connection with FIG. 12.

DETAILED DESCRIPTION OF THE PREFERRED EMBODIMENTS

To address the requirement for describing the best mode of carrying out the present invention and providing a full written description of the invention, an exemplary operating environment for the invention will be set out, followed by a complete description of how a person skilled in the art makes and uses the invention.

Exemplary Operating Environment

Figure 1:
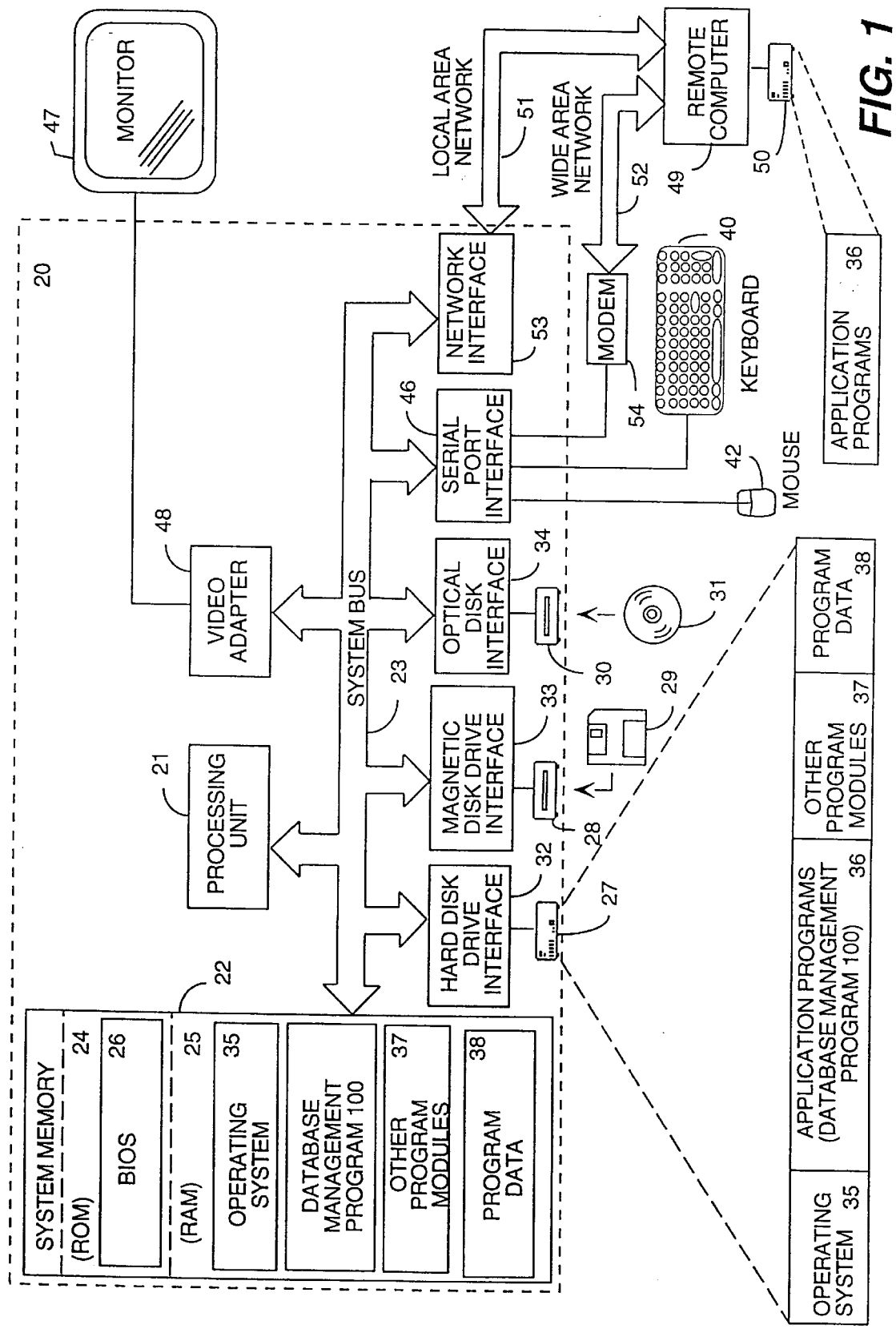
FIG. 1 is a functional block diagram of a computer system that provides an operating environment for the exemplary embodiments of the invention.

Referring now to the drawings, in which like numerals indicate like elements throughout the several figures, FIG. 1 and the following discussion are intended to provide a brief, general description of a suitable computing environment in which the invention may be implemented. While the invention will be described in the general context of a database software program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, one of the program modules is a database management software program 100 that includes certain embodiments of the invention, which are described below with reference to the remaining drawing figures. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are incorporated into the Cascade/DB application program available from MicroQuill Software Publishing, Inc. and Sabaki Corporation for use with personal computer systems such as the illustrative personal computer 20. It will be appreciated that the principles of the invention are not strictly limited to standalone database software programs, but could equivalently be applied to any computer-implemented system that involves the use of object-relational concepts and data storage, or any application that a query system is desired for accessing non-relational data structures. It will be further appreciated that the invention could equivalently be implemented on host or server computers other than personal computers, and could equivalently be transmitted to the host computer by means other than a CD-ROM, for example, by way of the network connection interface 53.

Notwithstanding the broad applicability of the principles of the invention described above, it should be understood that the configuration of the exemplary embodiment as an application program for widely-used personal computers provides significant advantages. In particular, the database management software program 100 described in this specification is specifically designed to exhibit acceptable memory-use and performance characteristics when implemented on the conventional personal computer system 20. In so configuring the database management software program 100, certain trade-off balances, particularly between the often conflicting goals of minimizing memory storage and increasing performance speed, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

In particular, the invention allows a database designer greater flexibility in choosing the tradeoff between embedded data vs. separate tables, as there no query penalty for storing data in embedded structures.

Prior Art Relational Database Systems

Figure 2:
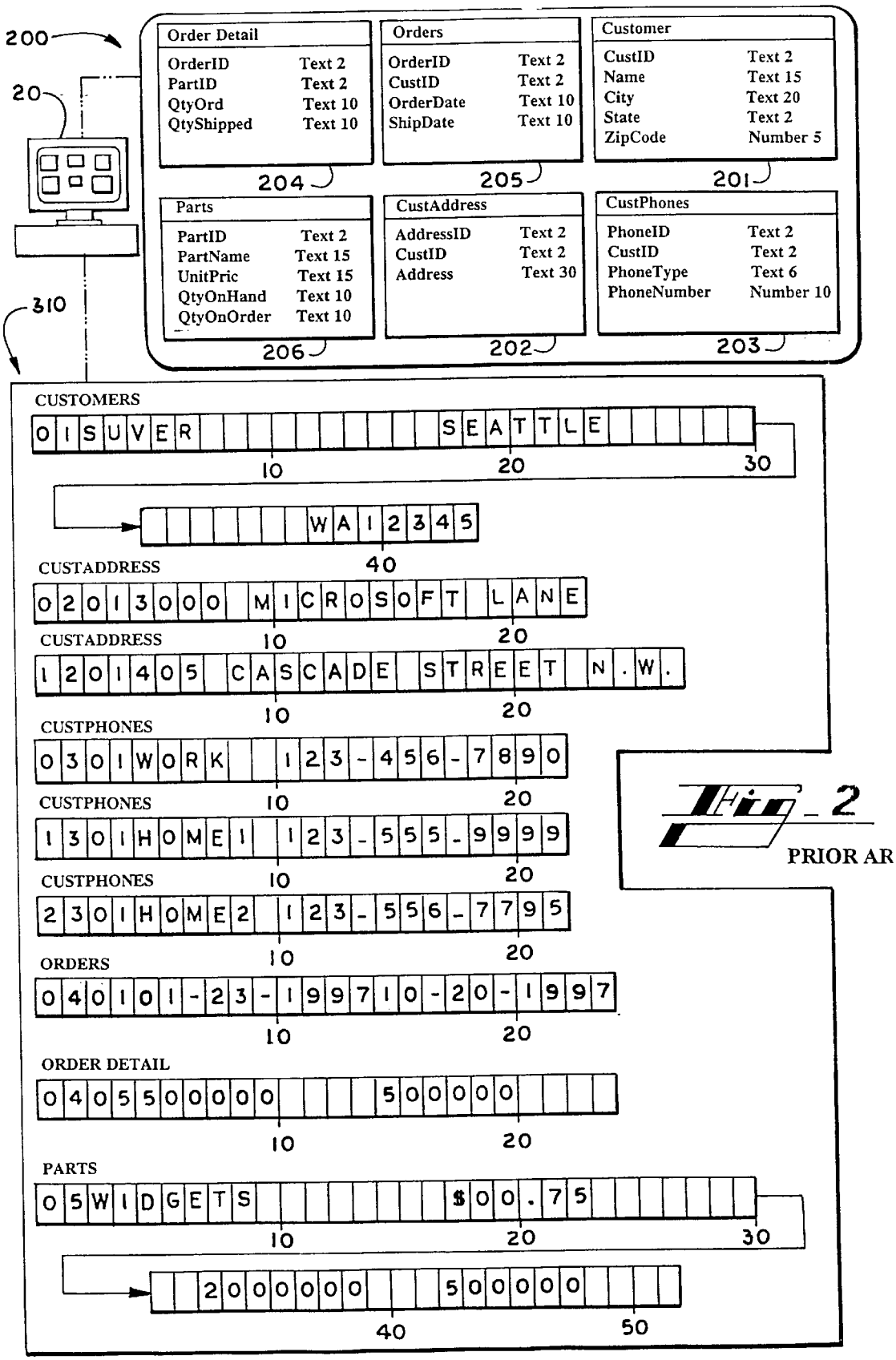
FIG. 2 illustrates database schema and fixed length record storage typically employed in prior art relational databases.

FIG. 2 illustrates exemplary database schema 200 and the prior art flat, dense, fixed length storage model commonly employed in a traditional relational database. The example provided in FIG. 2 is that of an invoicing system for a business enterprise implemented in a computer database. The invoicing system includes several schema tables identified as Customers 201, CustAddresses 202, CustPhones 203, Order Detail 204, Orders 205, and Parts 206, for storing detailed information about customers, customers' addresses, customers' telephone numbers, customers' orders, the orders themselves, and parts, respectively. These schema 200 define the contents of relational data tables such as those shown in FIG. 3 which store the actual data elements.

As used herein, the term "schema" is used in the general sense as data definitions that associate table or file names and attribute information in a data dictionary. In a conventional relational database, schema and data definitions define relations with information about table structures and data elements.

An actual data record or row in each of these tables has the appearance of that in FIG. 3, e.g. row 310, which has several columns 312a, 312b, 312c, 312d, etc. For purposes of this invention, the terms "row" and "column" are structurally equivalent to the terms "record" and "field", respectively, as are often used in connection with database terminology. Such terms may thus be considered synonymous, as both refer to a plurality of related data items that are considered as a group. The "row" or "record" refers to the plurality of data items as a whole, while the "column" or "field" refers to a selected particular one of the plurality of data items.

In FIG. 2, each of the tables in the schema 200 define the data columns that appear in the actual data tables, map into the tabular presentation form such as shown in FIG. 3. In FIG. 3, the Customers table 301 is defined by the Customers schema 201, the CustAddress table 302 is defined by the CustAddress schema 202, the CustPhones table 303 is defined by the CustPhones schema 203, etc. Note that the CustAddress table 302 and the CustPhones table 303 contain multiple entries all related to a particular individual, the customer with name "Suver" which is found at row 310, the Names column 312a in the table 301.

Referring back to FIG. 2, a fixed-length data record or row 310 associated with the particular customer "Suver" in the Customer table 301 contains several data items, such as the name, city, state, zip code. Note the empty space after the data "Suver" and "Seattle". Note also that there are no first or middle name values at all, yet the database still stores information (null values) for the spaces that could be used for first and middle names. Likewise, there are null values stored for the spaces after "Seattle", since space must be preserved for storing longer city names for other rows.

IBM and other relational-database pioneers originated this basic storage format, which allowed only a fixed-length value per column, in the 1970s. They chose this architecture because it was the simplest and quickest way to implement a storage engine, and because it was well matched to the computing and disk storage capabilities of the time. In the 1970s, when relational databases were first constructed, disk-access and memory-access times were roughly comparable, and the bottleneck was the CPU processing capability. If a single fixed-length value is stored in each column, every row in a table has the same size, so memory management when fetching rows from disk is easy and requires minimal CPU cycle. Once a row is fetched into main memory, the database engine can readily read or write a particular column value simply by jumping to a known offset for that column into the data record and then reading or then writing the next n bytes, where n is the size of a column in number of characters.

The principal downside for this conventional database architecture is that it forces the database designer to physically decompose complex business objects into multiple tables. This is manifested via the multiple tables 302, 303 for customer addresses and customer telephone numbers, which permit multiple rows to reflect that a customer may have multiple addresses or telephone numbers. Although the architecture is very fast for accessing simple data that can be stored in a single table, multiple tables complicate schema design and considerably slow access to complex objects. A database engine must join multiple rows from multiple tables simply to recompose a business object that was originally just one data "item" in the real world, e.g. a customer with more than one telephone number.

For example, where a particular customer has plural addresses and/or plural telephone numbers, plural rows in plural tables are required to store this multiple information as shown in FIG. 3. Note in FIG. 3 that the CustAddress table 302 contains two entries for the name "Suver" with one row having an address of "3000 Microsoft Lane" and a second row having an address of "1405 Cascade Street N.W.".

Likewise, if the same customer "Suver" has plural telephone numbers, a separate table is required. Note the CustPhones table 303 with three entries for different types of telephone, WORK, HOME1, and HOME2, with phone numbers respectively of "123-456-7890," "123-555-9999," and "123-556-7795." In order to present this information to a user of the database, the database engine must effect a "multiple join" known to those skilled in the relational database art, which involves combining information in these three different tables so as to obtain all of the information required to present the information associated with the single customer "Suver".

Object-Relational Database Model

The present invention takes a completely different approach to data storage. A database constructed in accordance with the present invention is stored in a variable-length, tagged, sparse physical data storage format. All data, regardless of data type, is stored in variable-length columns. Where a column does not have an atomic value, the database does not store any information for that column, not even a null value. Accordingly, when a row is stored, each column includes three principal pieces of information—a column identifier, a column data type identifier, and column data value corresponding to the information of the data item itself.

Figure 4:
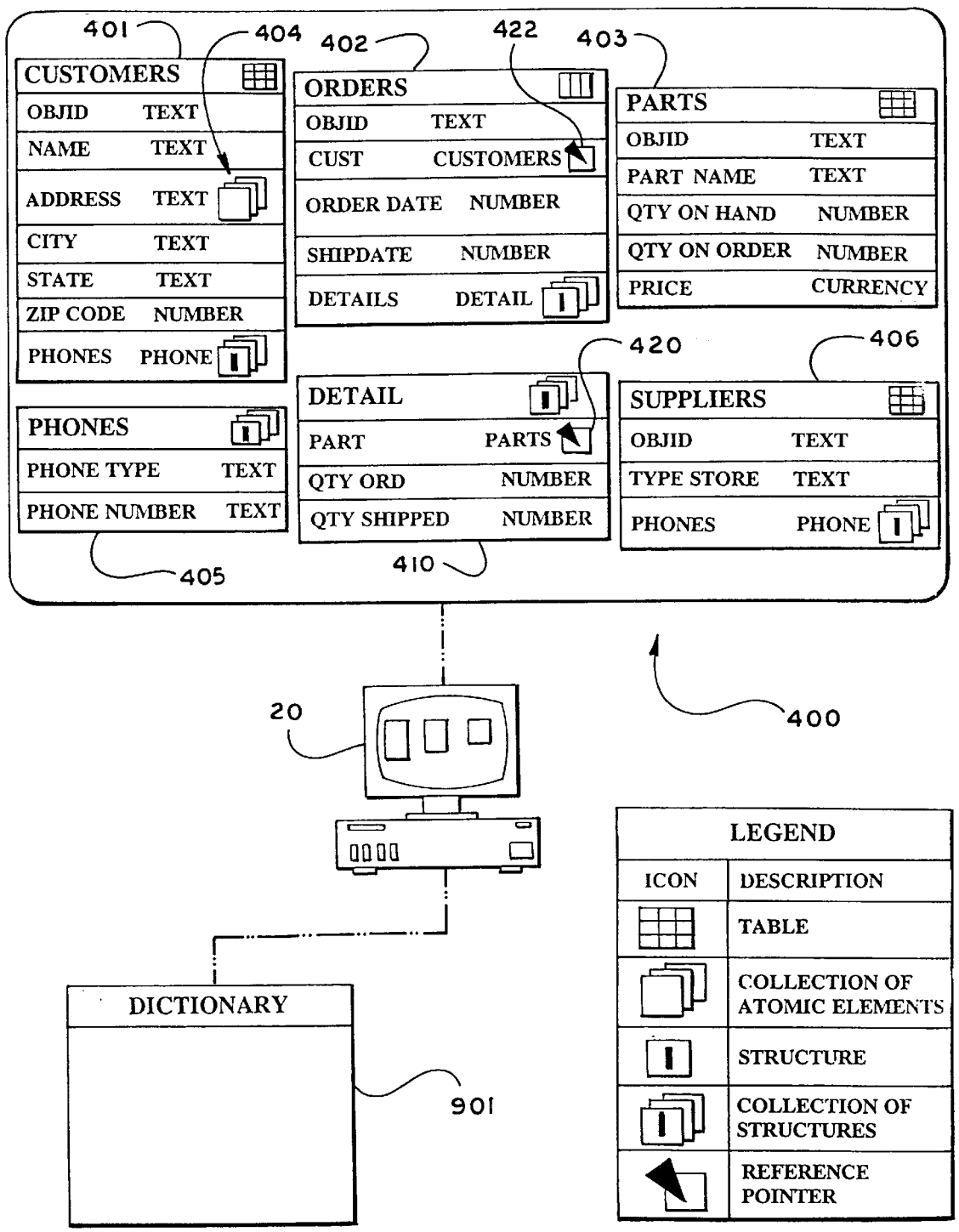
FIG. 4 illustrates database schema for an exemplary "invoice" object-relational database used as a discussion example for describing the preferred embodiments of the present invention.
Figure 5:
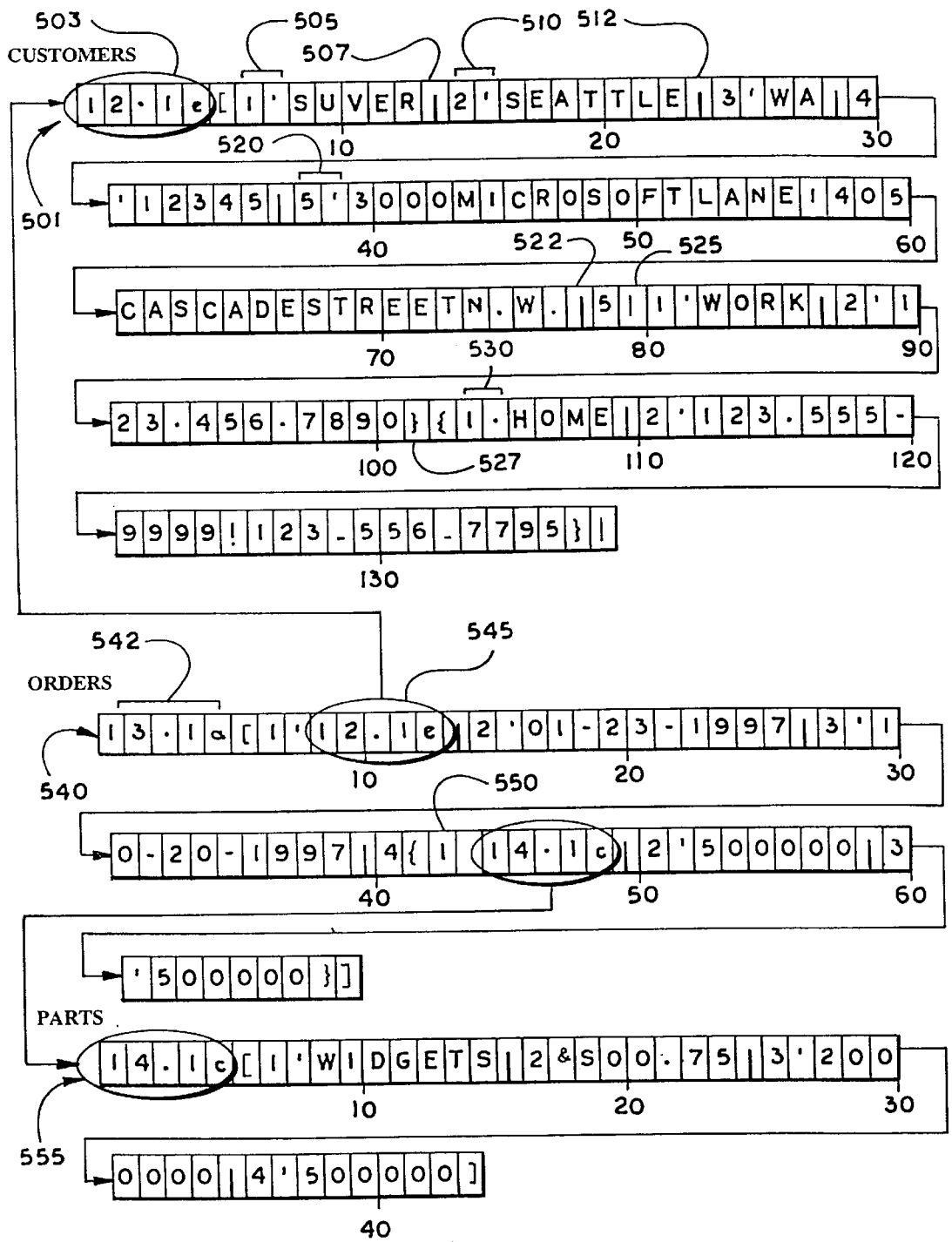
FIG. 5 is an example of a variable-length data storage model employed in the exemplary database of FIG. 4, with exemplary data rows from two different tables in the schema.

Turn next to FIG. 4 for a set of exemplary database schema 400 associated with the "invoices" business example introduced above as a discussion example, and FIG. 5 for an example of a variable length, tagged physical data record. The exemplary database schema 400 constructed in accordance with the present invention comprises a Customers schema 401, an Orders schema 402, a Parts schema 403, and a Suppliers schema 406, which define physical tables of data. Such tables may be seen in FIG. 6, FIG. 7, FIG. 8, and FIG. 10, respectively.

The Customers schema 401 is used to determine the layout of the data for a row found within a customers table such as that found at 601 in FIG. 6.

Note also in FIG. 4 that the schema group 400 includes a data dictionary identified at 901. For each table schema such as 401, 402, 403, 405, 406, 410, there is an entry in the dictionary 901 that maps table and type names to column information such as column names, identifiers, types, etc. This is described in greater detail in connection with FIG. 9.

In FIG. 4, the schema 401 defines a data row and data type in a Customers table as having seven different columns (fields), identified as object identifier (Objid), Name, City, State, Zip Code, Address, and Phones. Note that there is a separate Phone "sub-table" or structure 405 which comprises two different types of data items—PhoneType and PhoneNumber. Note further that the entry in the Address column includes an icon 404; this icon signifies that the address information is a collection of information, since in our discussion example there are plural addresses as well as plural telephones associated with a particular customer.

Referring next to FIG. 6, a typical row 605 of information in the Customer table 601 is shown with exemplary data, implementing the schema of FIG. 4. Note that for the Customer table 601, there is provision for data items labeled as object identifier (Objid), Name, City, State, Zip Code, Address, and Phones. These data items are in columns identified as 608a, 608b, 608c, 608d, 608e, 608f, 608g, respectively.

Note in column 608g that there is a separate Phones "sub-table" 603 which comprises two different types of data items, PhoneType and PhoneNumber. Note that the Phones column, a structure, stores a plurality of telephone numbers associated with the exemplary customer "Suver." Note further that the entry in the Address column 608f is a table 604 comprising a collection of information, namely, plural addresses, since in our discussion example there are plural addresses as well as plural telephones associated with the particular customer "Suver."

Still referring to FIG. 6, note still further that there is further embedded data within the Phones structure 603. Specifically, consider that the exemplary customer "Suver" has three telephone numbers, one for WORK and two for HOME. The PhoneNumber sub-column within the Phones structure 603 contains a collection comprising two telephone numbers that are associated with the HOME PhoneType. The present invention allows storage of further hierarchically nested data, such as a collection of HOME telephone numbers as a "sub-sub-table" within the Phones structure.

The foregoing illustrates that successive levels of nesting or hierarchical embedding are supported in the present invention. Any given column may contain a collection or a structure for storing data elements, and any given structure may itself contain further embedded collection or structure. There is no theoretical limit to the number of levels of nesting or embedding that are possible in the present invention.

It will be appreciated that the present invention allows embedding of sub-tables comprising collections and structures which themselves may comprise collections of sub-rows, sub-columns, etc.

FIG. 5 illustrates a row or record 501 that corresponds to the tabular presentation of FIG. 6 as the row 605, for the example of the customer "Suver" being discussed. This figure shows the variable length, tagged data row that is physically stored on a storage medium such as disk. The data row 501 begins with an object identifier 503, which is a unique number assigned by the database engine. When a new row is added to any table, a unique, permanent object identifier or row identifier is automatically assigned to the row. A row's object identifier never changes, and the object identifiers of deleted rows are not re-used. As a result, the object identifier for a given row gives that row a distinct identity that is persistent and independent of the contents of the row, and is independent of where the row is stored in physical storage media.

Subsequent to the object identifier 503, a left bracket "[" begins that actual data of the row, which continues to a right bracket "]" at the end of the row. Thus, the left and right brackets [ ] comprise a row delimiter.

Within the row 501, individual data items—whether atomic, collections, or structures—are identified with tags or column identifiers. These can take various forms. For example, the first substantive column in FIG. 6 is identified with the label "Name". This corresponds in FIG. 5 to an element identifier 505 comprising the numeric character "1", followed by a text type identifier comprising a graves accent ('), followed immediately by the character string "Suver", and delimited by a column delimiter "|" at 507.

The second column with the label "City" in FIG. 6 is identified within the data row 501 in FIG. 5 with a tag or column identifier 510 comprising the numeric character "2", again followed by a graves accent as text type identifier ('). This is followed by the data characters of the city "Seattle", followed by the column delimiter "|" at 512.

This basic approach of (1) column identifier, (2) type identifier, (3) atomic data, and (4) column delimiter is continued for columns of State and Zip Code since only single or atomic values happen to be stored in association with the exemplary row discussed in connection with FIG. 6.

As mentioned, column identifiers and delimiters are employed as "tags" to allow identification of specific information within the variable-length physical data storage. Different rows within physical storage are delimited by square brackets [ ]. Data elements comprising structures are delimited by curly braces { }. Data elements or atomic values are delimited by special characters, for example a graves accent character (') signifies text, other characters (e.g. &$) signifies currency, and other special characters signify dates, integers, floating point numbers, etc. Data columns are delimited at their ends by a bar character (|), while collections of data elements are separated by an exclamation point (!).

As mentioned, the exemplary row 605 in FIG. 6 includes a collection 604 comprising a plurality (two) of different addresses associated with the "Suver" row. Referring back to FIG. 5, in the physical data row 501, the existence of a collection is identified by providing a row identifier 520 for the Address column comprising of the numeric character "5" followed by a text type identifier ('), followed by a first collection item comprising a first string of characters "3000 Microsoft Lane", followed by a collection element delimiter (!). The first item in the collection is followed immediately by a second item in the collection comprising the string of characters "405 Cascade Street, N.W.", followed by a column delimiter (|) at 522. Accordingly, it will be understood that a collection of data items is identified by a column identifier and delimited by a column delimiter, in the same manner as for an atomic data item.

Still referring to FIG. 5 in conjunction with FIG. 6, a structure 603 is similarly identified and delimited with column identifier and delimited by a column delimiter. The structure 603 in the Phones column in FIG. 6 is represented in the data row 501 of FIG. 5 by providing a column identifier comprising the numeric character "6" followed by a text type identifier ('). The column "Phones" In this example contains an embedded structure rather than an atomic data element or a collection. The existence of an embedded structure is represented and stored in the preferred embodiment within braces { }.

The example discussed only includes a single structure in the row 501 (shown at 603 in the table of FIG. 6). The actual data in the row associated with this structure begins at the "{" at 525 and extends to the closing "}" at 527. It will be noted that the structure itself is a sub-table including sub-rows and sub-columns, as indicated in the schema in FIG. 4.

In FIG. 6, the structure 603 includes three entries for three different phone numbers, one for WORK and two for HOME, the two for HOME being further embedded as a further nested collection 610. There are thus two sub-columns within the embedded structure 603—PhoneType and PhoneNumber.

Referring back to FIG. 5, the structure 603 is identified by the column identifier "6", followed by the opening curly braces, followed by a "1" column identifier for PhoneType, followed by the text type identifier ('), followed by the text string "WORK", and delimited by the column delimiter (|). This identifies a PhoneType of "WORK". The telephone number itself is a PhoneNumber, and is identified by the column identifier "2" followed by the text type identifier ('), followed by the telephone number "123-456-7890".

The next entry in the Phones structure 603 is a further embedded collection of HOME type telephone numbers. Because the HOME type PhoneNumber is a collection, the first entry in the collection is identified by a first string "123-555-9999" delimited by the exclamation point (!) as collection item delimiter. In similar fashion, the second telephone number in the collection begins immediately after the collection item delimiter (!) as the string "123-556-7795", and delimited by the structure delimiter "}". (There is no need for a column delimiter "|" which is redundant since the structure delimiter terminates the column as well as the structure.)

This data provides an example of a second level of embedding or nesting, with a collection of telephone numbers associated with the PhoneType HOME. The example illustrates how successive levels of nesting can be provided in the preferred embodiment of the present invention ad infinitum.

Use of Object Identifiers for Linking Tables

According to another aspect of the invention, object identifiers (Objid) are employed to reference different tables in a relational manner, in accordance with the object-relational properties of the invention. In this regard, FIG. 5 illustrates the use of an object identifier to link related tables.

In preferred embodiments of the present invention, related tables are linked with object identifiers rather than "keys" which are employed in prior art relational database methodology. If a user wants to tie two tables together, a system constructed in accordance with the present invention allows simply storing the object identifier of a row from an external or second table in a column or location normally employed to store a foreign key. A specific example of use of the object identifier will be discussed next, in the context of relating the Orders table 701 in FIG. 7 to the Customers table 601 in FIG. 6 and the Parts table 801 in FIG. 8. The schema for these tables is found in FIG. 4.

In the schema of FIG. 4, note that the Detail sub-table 410 includes a pointer or reference to ("RefTo") 420 to the Parts table 403. Similarly, note that the Orders schema 402 includes a reference 422 to the Customers schema 401. In the case of the reference 420, the user has created a separate Parts table comprising a collection of rows, each identified with a unique object identifier, with columns denominated PartName, QtyOnHand, QtyOnOrder, and Price, corresponding respectively to a part name, a quantity of parts on hand, a quantity of parts on order, and a price. Therefore, for a given row in an Orders table, rather than store all of the data associated with all of the Part, the object identifier of the particular part(s) being referenced is stored in the Part column in the Detail structure 410.

Similarly, rather than storing specific information associated with a specific customer in the Orders table 402, the object identifier of a specified customer is stored in the Cust row. This is illustrated in FIG. 5.

FIG. 5 shows an exemplary physical row 540 that might be found in an Orders table constructed in accordance with the Orders schema 402 in FIG. 4. As is the case for any row in the present invention, the exemplary row 540 begins with an object identifier (Objid) 542, followed by the row identifier delimiter "[", and extends to the ending delimiter "]" at the end of the row. The data elements contained in the row 540 will contain the items of Cust, OrderDate, ShipDate, and Detail, as specified by the schema 402 in FIG. 4.

The first data item in the row 540 is the identification of a specific customer in the first column, as identified by the column identifier "1", followed by data text type identifier ('), followed by the data string "12.1e" at 545. This corresponds to the object identifier 503 in the Customers table. The string is delimited by the column delimiter "|". It will therefore be appreciated that rather than storing all of the information associated with the customer "Suver", only the object identifier "12.1e" is stored, which completely and unambiguously identifies the particular customer "Suver".

The next two data items in the row 540 for OrderDate and ShipDate are identified respectively with column identifier "2", followed by data text type identifier ('), followed by the data string "01-23-1997,", followed by the column delimiter "|", column identifier "3", followed by data text type identifier ('), followed by the data string "10-20-1997,", followed by the column delimiter "|".

The next column in the row 540 is stored in a Detail subtable defined by the schema 410 Thus, note in the row 540 that the 4th column is a structure Detail. This structure is identified by the column identifier "4", followed by data text type identifier ('), followed by an opening curly brace "{" in the row, which signifies the occurrence of an embedded structure. The structure extends to the closing curly brace } occurring as the next to last character in the row.

As the schema 410 indicates, there are three subcolumns in the embedded structure in the Detail column—Parts, QtyOrd, and QtyShipped, which correspond to part identification, quantity ordered, and quantity shipped, respectively. This is shown in a "virtual table" at 701 in FIG. 7. These three subcolumns of the Detail structure are reflected in the data record 540 as follows: the first subcolumn (Part) is identified by the column identifier "1" at 550 and type identifier ('), followed by the data string "14.1c" followed by a column delimiter "|". The second subcolumn (QtyOrd) is identified by the column identifier "2", followed by the data string "500000", followed by the column delimiter "|". Finally, the third subcolumn (QtyShipped) is identified by the column identifier "3' ", followed by the data string "500000", followed by the closing curly brace "}" occurring as the next to last character. The closing curly brace denotes the end of the structured column, as this is the end of the row. The closing bracket "]" denotes the termination of the set of columns and of the row itself.

As in the case for the storage of the customer object identifier, a Part object identifier is stored as the first entry to link to a related table Parts. It will therefore be appreciated that the storage of a Parts object identifier "14.1c" allows a reference to an external table which corresponds to the Parts schema 403 shown in FIG. 4. Note in FIG. 5 how the object identifier "14.1c" occurs in the data row 540 for Orders, as well as for a specific part in a data row 555 representing the variable length, tagged representation of the data.

Those skilled in the art will understand and appreciate that object identifiers and keys have certain similarities and similar functions. However, in the present invention, object identifiers provide several significant advantages: simplified query syntax, simpler one-to-many and many-to-many relationships, improved performance due to "indexless joins", and the ability to write to multiple tables without multiple cursors. Further explanation of these advantages is provided next.

Regarding simpler query syntax, a system constructed in accordance with the present invention provides a simpler query syntax because object identifiers are completely maintained and controlled by the database engine. As described previously, the preferred database engine assigns unique object identifiers to each row regardless of whether the row is maintained in a table, a subtable, a sub-subtable, etc. For example, if one uses object identifiers to reference rows in an external or foreign table, the user can treat the columns in the foreign or external table as if such columns were part of the table specified in a FROM clause in SQL format. Instead of explicitly defining in every query how two tables are joined, a user can simply use a dot operator (.) to specify which columns should be accessed from the foreign table. This is described in more detail below in connection with the section describing access methodologies for collections and structures.

For example, an exemplary query to find a given part price in the invoice example might appear as follows:

SELECT Orders.Objid, Parts.Price FROM Orders.Detail WHERE Parts.Price="$50.00"

Note that even though data is being accessed from two separate tables, the Order table and the Parts table, a user did not have to explicitly define a "join" operation common to relational databases. Once a reference is added to a column in the table with an object identifier to another table, a system constructed in accordance with the present invention "knows" that the tables are linked by virtue of the occurrence of object identifier so that the user does not have to spell it out with every single query.

The use of object identifiers also provides simpler one-to-many and many-to-many relationships. Those skilled in the art will understand that these types of relationships allow connection of an entry in one table to many entries in another table, and many entries in one table to many entries in another table. With a system constructed in accordance with the present invention, if the relationship between tables is a one-to-many or a many-to-many relationship, the user can define a column as containing a collection. This collection would contain a plurality of object identifiers. This would entail storage of object identifiers of multiple rows in the collection column, and completely eliminate the need for a synthetic junction table defining many-to-many relationships in conventional relational databases.

The present invention further provides improved performance due to "indexless joins". In a system constructed in accordance with the invention, a column containing an object identifier as a data entry will contain the object identifier of a row contained in the referenced table and will cache the physical disk address of that row. As a result, the database engine will not require access to the object identifier index to locate a row referenced in the manner. Rather, the engine can directly access that row's location stored physically on storage medium such as a disk. This permits what is characterized as an "indexless join". Such an indexless join eliminates index lookups so as to allow access to data located in foreign tables more rapidly than in conventional relational databases.

Dictionary

It will be recalled from the discussion in connection with FIG. 4 that the preferred embodiment of the present invention includes a dictionary that maps table and type names to column information such as column names, column type, column identifiers, etc. For each table schema such as 401, 402, 403, 405, 406, 410, there is an entry in the dictionary 901 that maps the table or UDT to this column information.

FIG. 9 illustrates an exemplary dictionary 901. There are several columns in the dictionary, including Table/Type Name, Table or UDT, and Column Information. The Table/Type Name column stores the name of a table or a UDT, e.g. Customers, Orders, Phone, Detail, etc. The Table or UDT column stores a flag indicating whether the named item associated therewith is a table or a user defined type. The Column Information column stores information about the various column(s) within the associated named table or UDT. Specific information stored includes column name, column type (e.g. text, integer, structure, RefTo, structure, etc.), a column identifier, and a Collection flag to indicate whether the indicated column is a collection.

For example, in FIG. 9 the Customers table is a "table", with various column names of Name, City, State, Zip Code, Address, and Phones. Note that the Phones column has a "Phone" type, which is a UDT. Note that the Address column is indicated as comprising a collection, as is the Phones column.

Those skilled in the art will understand that as a definition of a given table or UDT is read into memory, information about the table and any UDTs utilized in that table are entered into the dictionary. This is carried out one table at a time. For every table and for every UDT, there will be an entry in the dictionary that can be accessed by table name or is by UDT, in association with a list of columns that are contained in that table or that type, including the column name, the type of column, and the column identifier.

It will be appreciated that there is a need to distinguish between tables and UDTs in the dictionary because tables make nonembedded physical rows on the disk, but UDTs make embedded rows. For either tables or embedded UDTs, the dictionary is accessed to determine the characteristics of the columns contained in the table or in the UDT, as appropriate, so that the relevant actual data items can be accessed in the embedded, hierarchical fashion. A system constructed in accordance with the invention accesses the dictionary 901 as necessary to determine what the column identifiers are, the labels associated therewith (for display, printing, etc.), the data types of the atomic data values, of structures, of collections, etc.

Accessing Data by User Defined Type (UDT)

Another aspect of the present invention relates to the use of user defined types (UDT) to access data by type. This capability exists for a single table or multiple tables. The use of UDTs allows searching by type utilizing a simple query extension wherein a data type name replaces the use of a table name in the query.

Refer next to FIG. 6 in conjunction with FIG. 10 and FIG. 11. As discussed above in connection with FIG. 6, the Phones column in the table 601 includes a subtable 603 which is a structure. A structure is a particular data type, as will be recalled from FIG. 9. FIG. 10 illustrates a Supplier table 1001 containing columns for an object identifier, a SupplierType column, and a Phones column. Assume for purposes of this example that the Phones column is defined to include a similarly-defined structure as shown at 1005. Assume further that the Phones structure 1005 uses the same UDT as the Phones structure 603 in the Customers table shown in FIG. 6.

FIG. 11 illustrates exemplary rows 1101, 1103 associated with particular data entries in the two different tables, Customers and Suppliers. The Customer row 1101 is the same as that shown in FIG. 5 at 501. The Supplier data row 1101 is constructed similarly to that described above, and corresponds to the table shown in FIG. 10. Note the existence in FIG. 11 of a common HOME telephone number identified by the reference numeral 1105 in both data rows. For purposes of this example, it will be understood and appreciated that both data schema defining the contents of a Customer row and of a Supplier row include a Phones structure or subtable with subcolumns PhoneType and PhoneNumber.

In the present invention, a data lookup or query by type into a single table or across multiple tables (e.g. Customers and Suppliers) that embed similar structure types can be constructed. Such a query is formulated by specifying a particular user defined type (e.g. a particular user defined structure) and optionally a table or multiple tables containing the specified type. The example being discussed relates to multiple tables, but applies equally for a lookup by type in a single table.

In the example given, let us assume that the user wishes to access its Customers table and its Suppliers table to determine if there are any common telephone numbers, suggesting that one of its customers is also one of its suppliers. Although this example is somewhat contrived, it illustrates that the point that a system constructed in accordance with the present invention allows a query by type across multiple tables. An exemplary query on the Customers and Supplier tables shown in FIG. 6 and FIG. 10 would appear as follows:

SELECT * FROM Phone in (Supplier, Customer) WHERE PhoneNumber="123-555-9999"

This query will return all data rows from the Customers and Suppliers tables that contain the identified telephone number.

It will therefore be appreciated that in addition to being part of rows that they are embedded in, data in a collections and structure value columns can be queried directly as if they were independent tables. It will be further appreciated that in a database engine constructed in accordance with the present invention a collection of structures appears as a logical table, with its parent table name automatically prefixed. A user can query this data just as the user would query data in any other standalone table. Accordingly, it will be further appreciated that the extended storage model described herein allows simple access in a simple query form. Even though the PhoneNumber information is embedded into subtable within the Suppliers table and the Customers table, the user can still write a simple query to access information across the multiple tables as if each were in an independent table.

It is axiomatic in conventional relational databases that, if a database follows relational rules, a user can view data as relations and the user can perform basic operations on these relations such as select, insert, delete, join, append, subtract, union, etc. This permits performance of queries and transformations. These traditional models state that although information is viewed as relations, it is not necessarily stored as relations. The present invention, even though it stores data using a richer storage model, still permits viewing the data in a relational fashion. Thus, when multiple telephone numbers are stored in a Phones collection in a column in a given table, the database engine constructed in accordance with the invention also logically provides a Phones collection as a separate virtual table identified as for example Suppliers-.Phones or Customers.Phones. This permits a query in the following form:

SELECT * FROM Customers.Phones Where PhoneNumber="123-555-9999"

This query returns all phone number elements from the Customers table that contain the specified telephone number.

Storage of Multiple Values in a Single Column

Prior art traditional relational databases restrict users to storing one value in each column. A system constructed as described herein, because it does not presuppose a column length and because it uses a tagged data format (with column identifiers), the system can store collections of values in a single column. With collections, it is not required to create multiple columns (or separate tables) for multiple street addresses, phone numbers, status codes, etc. Instead, a user merely defines a column to be collection-valued, which permits the storage of as many or as few values in that column as may be desired. There is no theoretical limit on the number of values a collection-value column can hold. FIG. 5 illustrates database schema 501 comprising a Customer schema having a column identified as Address. The icon 505 identifies the column as being collection-valued. As discussed above, a plurality of different data items may be stored as the collection in the address column.

FIG. 6 illustrates a table 601, with a collection 604 comprising a plurality of address entries, namely "3000 Microsoft Lane" as a first collection value and "405 Cascade Street N.W." as a second collection value. As shown in FIG. 5, this collection is identified in the exemplary data row 501 with the column identifier 520 comprising the character "5" followed by the two address entries that are separated by the exclamation point "!" collection element delimiter, terminated by the column delimiter "|" at 522.

When a user adds values to a collection-valued column, a system constructed as described herein delimits multiple values with a separator character comprising the exclamation point.

It should be understood at this juncture that in addition to collections of data items (i.e., atomic data items), the user can employ collections of structures to replace the need for foreign tables, and thereby simply the database schema and eliminate joint operations frequently required in conventional relational database structures. This embedded use of collections of data and collections of structures has been found to dramatically improve access performance.

User-Defined Structures and Collections of Structures as a Single Column Value As described above, the present invention allows a user to create and define structures or groups of columns comprising subcolumns as a virtual subtable, and store those structures as a single column value. Like other columns, structures can be collection-valued. In effect, this allows users of the present invention to "nest" or embed an entire subtable in a single column. Moreover, because the structure described herein permits nesting collections and structures to any depth, users can store highly complex objects as a single column value.

In the example described in connection with FIG. 4, the type of telephone number (e.g., office, direct dial, fax, home, cellular, etc.) is stored as the PhoneType data within the Phone structure 405. In a flat, dense, fixed-length storage model employed in conventional relational databases, a separate Phones table would be required. Each entry in the Customers would require a row for each customer, as well as multiple rows in the Phones table.

In a system constructed as described herein, a user would create a user defined type comprising a Phone structure 405 that contains two columns: PhoneNumber and PhoneType. The user would then add a Phones column to the Customers table 401 (as well as to the Supplier table, in this example) and specify the Phone structure as data type of that column. Because the Phones column contains a structure, the user can store values for both the phone number and for the phone type in the one column in the Customers table, effectively stored as a virtual subtable. In addition, if the Phones column is defined as a collection, users can store multiple phone numbers and/or phone types in that column.

Basic Access Queries and Format

Systems constructed in accordance with the present invention makes data access easier and faster without losing familiar database paradigms and query models including SQL SELECT, cursors, and bookmarks. Accessing data and systems constructed with the invention is almost identical with accessing data in other relational databases, except that certain advantages are afforded. Accessing complex data is easier and faster, by issuing database commands in basic SQL format. For purposes of the present invention, convenient SQL extensions are provided for accessing data items in collections and structures, and data in collections and structures appears as independent tables (or subtables) to the query process.

Those skilled in the art will appreciate that database commands in basic SQL format include commands such as ALTER TABLE, CREATE TABLE, CREATE VIEW, DELETE FROM, INSERT INTO, SELECT FROM, UPDATE, and SET. Any database command that involves accessing a table with its embedded data in the manner described herein may be employed.

Those skilled in the art will thus understand that the general syntax for database commands in the present invention is that of a conventional SQL format, well known to those skilled in the art. For purposes of the invention, the conventional SQL syntax is modified to include the dot (•) operator for specifying embedded collections and structures in tables. The dot operator separates table names from a structure names and from an atomic element names, etc. The conventional SQL syntax is further extended in the present invention to allow the use of UDTs where table names otherwise would be used, and to allow use of the "IN" clause to limit the set of target tables in which UDTs might be found.

Although there are various types of database commands, as mentioned above, one of the most frequently used is the SELECT command which finds particular utility in the present invention. A SELECT query has the following basic syntax:

```
SELECT [DISTINCT|ALL] <LIST OF COLUMNS,
FUNCTIONS, CONSTANTS, ETC.>
FROM <LIST OF TABLES OR VIEWS>
[WHERE <CONDITION(S)>]
[ORDER BY <ORDERING COLUMN(S)> [ASC|DESC]];
``` where ASC|DESC allows the ordering to be done in ASCending or DESCending order

Accessing complex data is easier and faster in systems constructed in accordance with the invention. With a single disk read, the system can access all of the complex or hierarchically stored data that is stored in a single row. There is no need for joining tables or open multiple cursors. Therefore, the present invention's system is much faster and more convenient than traditional relational databases.

When an SQL statement is specified to retrieve values from a database constructed in accordance with the invention, the query is often identical to a comparable query used in a traditional relational database. However, because more complex data is stored in a single row, more complex results can be obtained from a query operation. The basic form of a query is as follows, with a specific example of the Customers table in FIG. 6:

SELECT * FROM Customers WHERE Name ="Suver"

This type of query returns the entire row for the Customer "Suver" just as in a traditional relational database. However, the row returned by the database engine contains all of the data on the Customer with name "Suver", including all embedded data such as telephone number(s) and phone type values. Moreover, because the query returns just one row, it requires just one index lookup and disk read.

A system constructed with the invention is much faster than one that retrieves the same data from a relational database, which requires reading multiple rows from separate tables. To retrieve the same data in a traditional relational database, where the data is located in two separate tables, the database engine requires two less convenient and slower alternatives: multiple cursors or join operations.

Opening multiple cursors in a conventional relational database provides the advantage that only the data requested is retrieved, without redundancy. However, opening a cursor for two separate tables requires more synchronization programming between the cursors and the multiple tables. In addition, a conventional relational database requires an index look-up and disk read for the row and then an additional index or disk-read for each corresponding row in the table.

Alternatively, a conventional relational database system can invoke a "join" operation of the multiple tables. This eliminates the synchronization of cursors, but the retrieval operation may result in a set of rows with large amounts of redundant data. For example, a join operation would result in two rows for the "Suver" customer in the database schema of FIG. 3 would result in the following "joined" table:

| Name  | City    | State | Zip   | Phone Type | Phone Number |
|-------|---------|-------|-------|------------|--------------|
| Suver | Seattle | WA    | 12345 | WORK       | 123-456-7890 |
| Suver | Seattle | WA    | 12345 | HOME 1     | 123-555-9999 |
| Suver | Seattle | WA    | 12345 | HOME 2     | 123-556-7795 |

Note that the data from the Customers table in all three rows is completely redundant except for the PhoneType and PhoneNumber. While this is a trivial example, once the "join" operation is executed and the rows are returned, a user of the database must either write code to strip out redundant data or work with it. In addition, as the number of tables being joined increases, there is increase in complexity and degradation in performance.

Even though only one cursor was employed and one SELECT operation was issued to conduct the join operation, the database engine must still perform an index look-up/disk read for the row containing the customer information, and then perform an additional index look-up/disk read for each corresponding row in the Phones table. This results in a performance degradation which can become more pronounced in more complex applications, where a traditional database stores the same detail in many rows.

Accessing Values in Collections and Structures

As described earlier, the basic query operation employed in systems constructed in accordance with the invention utilizes standard SQL query operators. One particular difference is that operators that reference tables include a dot (•) operator for de-referencing multiple columns in a structure. The dot operator is employed for de-referencing. This SQL extension provides convenient and direct access to nested data in collections and structures.

To access data in a user-defined structure, a query specifies the structure or table name, a dot operator(•), and a column name. For example, and still referring to the Customers table 601 in FIG. 6, note that there is a Phones column whose data type is Phones, which contains the sub-columns PhoneType and PhoneNumber. In addition, Phones is defined in this example as a collection, so the system can store multiple phone numbers and phone types in the Phones column. The following query returns just the phone number 123-456-7890, and not the phone type for that number.

SELECT Phones(*).PhoneNumber FROM Customers WHERE Name="Suver"

The following query would return the phone numbers for every customer who has a home telephone number:

SELECT Phones(*).PhoneNumber FROM Customers WHERE Phones(ANY).PhoneType="Work"

It will now be understood that the dot operator (•) works in the same manner when accessing columns in other tables. For example, suppose that the PhoneType and the PhoneNumber were employed in a separate table (as shown at 303 in FIG. 3) instead of in an embedded structure. To relate rows in a Phones table to a customer in a Customers table, a system utilizing the invention might include a "RefTo" collection column called PhoneRef to the Customers table. This RefTo column contains the object IDs of one or more rows in the Phones table. To access telephone numbers in the Phones table when implemented separately, an identical query would be employed:

SELECT PhoneRef(*).PhoneNumber FROM Customers WHERE PhoneRef(ANY).Phone Type ="HOME"

Accordingly, it will be appreciated that if tables are linked using object identifiers, there is no need to write a "join" clause and specify which key columns to use every time data should be accessed in another table.

Flow Diagrams Illustrating Methodologies

Figure 12:
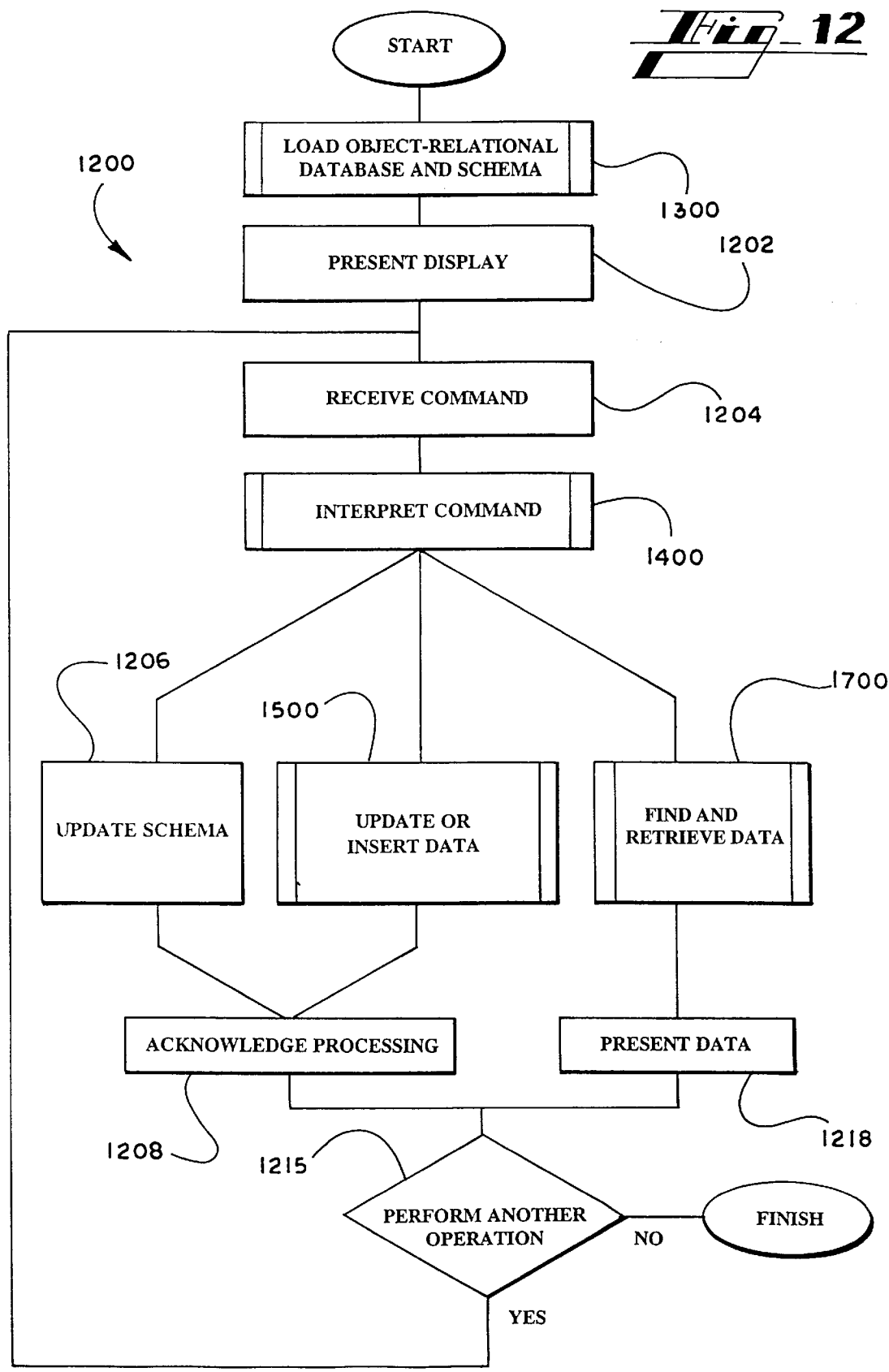
FIG. 12 is a logic flow diagram illustrating a computer-implemented method for storing and accessing embedded information in an object-relational database constructed in accordance with a preferred aspect of the present invention.

Turn now to FIG. 12 for an explanation of the various computer-implemented steps for implementing an object-relational database containing embedded data constructed in accordance with the present invention. FIG. 12 is a logic flow diagram illustrating a method 1200 for implementing an object-relational database with embedded information. In particular, this figure illustrates the method for accessing information in response to receipt of database commands or queries in the basic form as described above.

The first step taken in the method 1200 is to call the routine 1300, which is invoked when a user activates or launches a computer program constructed in accordance with the present invention. It is assumed that computer program code that implements a computer database is loaded into the computer's random access memory (RAM), and that corresponding database schema have been established in accordance with that shown in the examples described above, with rows of data in the variable-length records as discussed.

In response to the activation of routine 1300, a database file constructed as described herein with corresponding schema is loaded, as described in connection with FIG. 13. Upon completion of the loading routine 1300, control passes to step 1202. At step 1202, any predetermined data layout or formats associated with the operation of the computer program are displayed on a display device so as to allow user interaction therewith. Control passes to step 1204, which is responsive to receive a user database command, in particular a query that causes retrieval of data from the database and/or the manipulation of the data. The system then awaits entry of a database command entered by the user.

After receiving a command (e.g. a query or other database command), control passes to routine 1400, where the command is interpreted as described in connection with FIG. 14. From routine 1400, one of at least three possible general choices is possible: update the schema at step 1206, update or insert data with a routine 1500, or find and retrieve data with a routine 1700.

Step 1206 carries out the task of updating the database schema. Such a step would be carried out if the user wished to modify the database schema by adding data types, adding new columns to the schema, etc. After the step of updating the schema, control passes to step 1208, where an message is displayed to the user to acknowledge the processing operation, and control passes to step 1215, where the inquiry is made whether other operations are to be performed. If so, the "yes" branch is taken back to step 1204. Ultimately, the user may provide an "exit" command, which will result in taking the "no" branch from step 1215 and operations associated with the program will end.

Routine 1500 is provided for the task of update or insert data, as described in connection with FIG. 15, and a routine 1700 is provided for the task of finding and retrieving data, as described in connection with FIG. 17. The routine 1500 passes control to step 1208, which is operative for acknowledging the processing.

The routine 1700, on the other hand, passes control to step 1218, where the results of the routine (i.e., data found and retrieved) are presented to the user as a results set for display, printing, or other manipulation. Control then passes to inquiry 1215 for possible looping back to process other commands.

Figure 13:
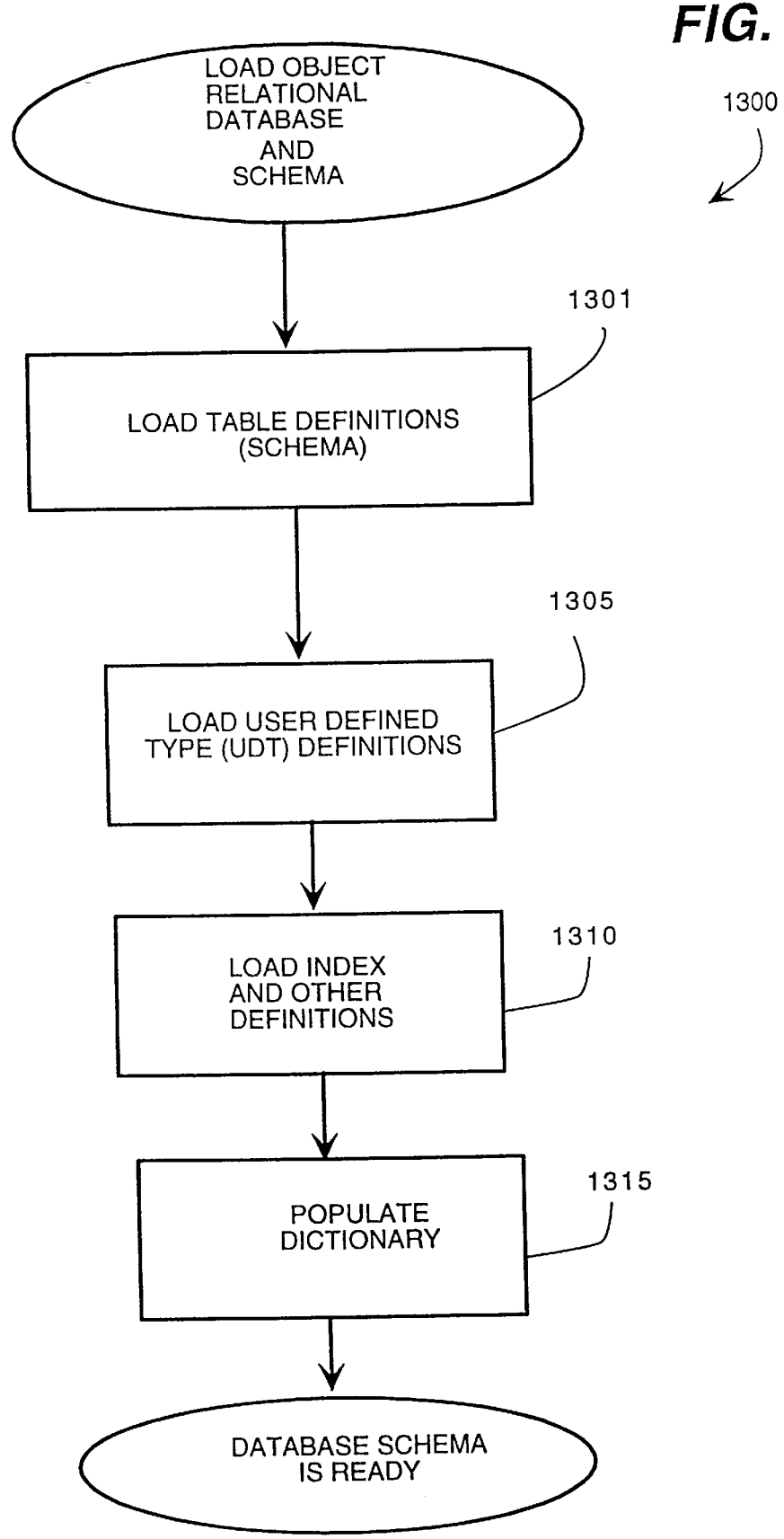
FIG. 13 is a logic flow diagram of a routine within the method described in connection with FIG. 12.

FIG. 13 illustrates the steps taken for the routine 1300, which involves loading an object-relational database and corresponding database schema constructed in accordance with the present invention. At step 1301, definitions of tables (i.e., schema) are loaded; at step 1305 any definitions of user-defined types (UDTS) are loaded; and at step 1310, any b-tree indexes or other data structures required for operations of the database are loaded into memory in preparation for processing operations. At step 1315, the in-memory database dictionary that relates schema names to tables or data types, column names, column identifiers, etc. is populated in preparation for accessing operations, as described in connection with FIG. 9. (In the preferred embodiment, the step of populating the dictionary is carried out as table and UDT definitions are loaded, but step 1315 is shown as a separate step for clarity.) After these steps, the database is ready for operations as described herein.

Figure 14:
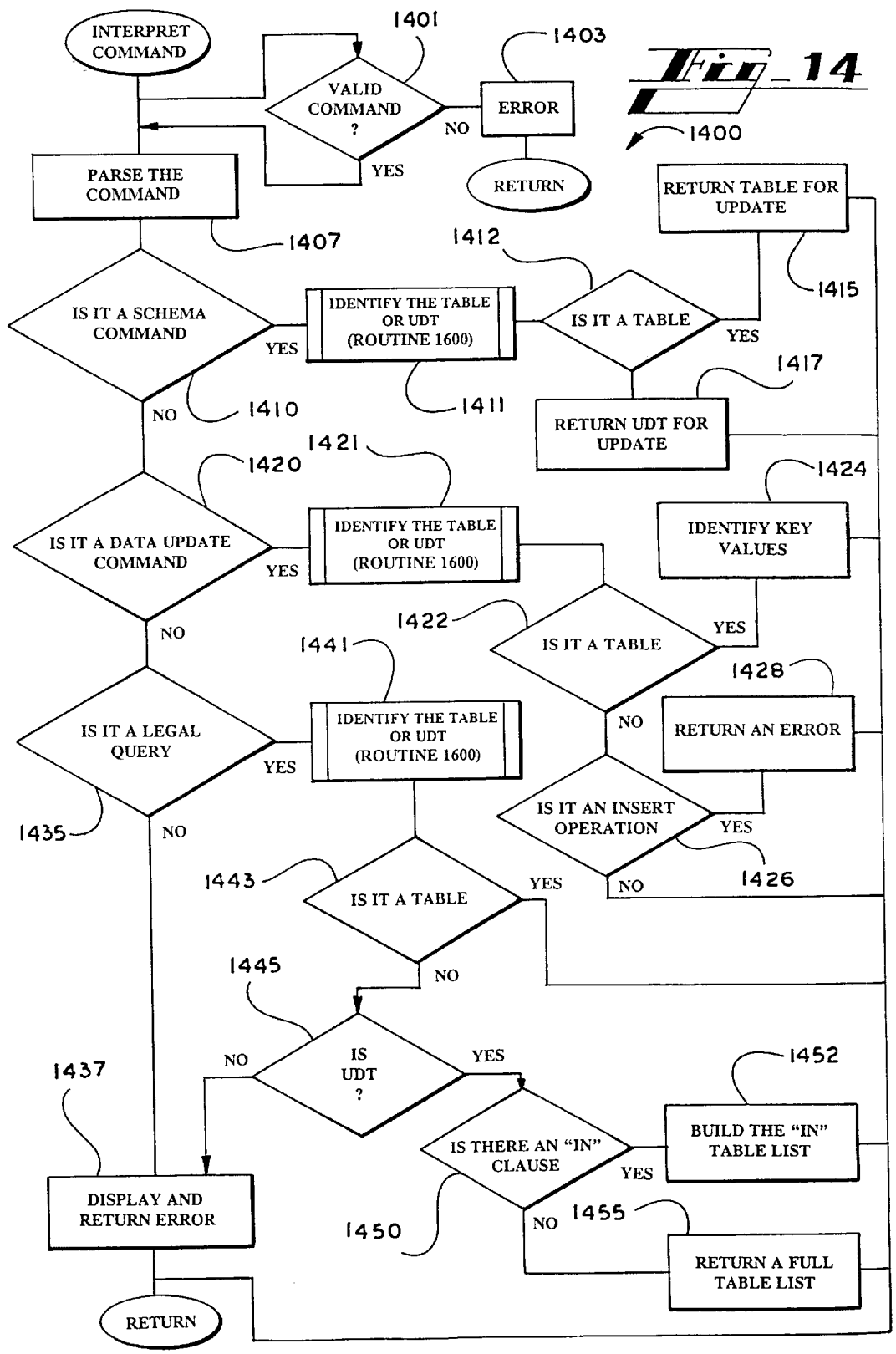
FIG. 14 is a logic flow diagram of a routine within the method described in connection with FIG. 12.

FIG. 14 illustrates a routine 1400 for interpreting a database command. Such commands often take the form of SQL type queries, with certain extensions which provide the additional functionality associated with the present invention. Beginning at step 1401, the first step taken is to determine whether the command is valid. If not, an error condition is indicated by taking the "no" branch to step 1403, and the routine exits. If the command is valid, control passes via the "yes" branch to step 1407.

At step 1407, the command is parsed and examined for processing. At least three basic types of commands are processed in the invention—a schema command, a data update (or delete) command, and a query.

At step 1410, the inquiry is made whether the command is a schema command. This involves commands such as adding or deleting a table, adding or dropping a column, add or drop an index, etc. Schema commands can only be applied directly to a UDT or to a table. Use of embedding or UDT "IN" clauses are not valid in schema updates. Such commands will typically be applied to a particular table or UDT in the database. If so, the "yes" branch is taken to step 1411, which is operative to call routine 1600.

Routine 1600, described in connection with FIG. 16, carries out steps for identifying the particular table or UDT involved in the schema command. Routine 1600 returns a list of tables and/or UDTs for further processing, and passes control to step 1412. At step 1412, the inquiry is made whether the item involved with the schema command is a table or a UDT. If a table, the "yes" branch is taken to step 1415, and the table involved in the operation is returned as a result from the command interpretation routine 1400. If the item is a UDT, the "no" branch is taken to step 1417, and the UDT involved in the operation is returned as a result from the command interpretation routine 1400.

Returning to step 1410, if the command is not a schema command, control passes via the "no" branch to step 1420, where the inquiry is made whether the command is a data update command. This involves operations such as insert row, update row, delete row, etc. This operation must handle the case where an insertion into a table or into a UDT is involved. If a data update command is involved, the "yes" branch is taken to step 1421 to call routine 1600. Routine 1600 returns a list of tables and/or UDTs for further processing, and passes control to step 1422.

At step 1422, the inquiry is made whether the item involved in the operation is a table. If so, the "yes" branch is taken to step 1424, where the key values in the table are identified so that the operation can be carried out. This involves a determination whether there is enough information provided in the command to identify the rows involved in the operation. It will be appreciated that some operations can be conducted with very little identifying information (e.g., a delete operation), while other operations (e.g, an insert into a table) require complete information in the form of "key values". When an embedded table is involved, key information is needed both from the embedded row and from the table.

For example, if a new line item such as a new Detail (referring to FIG. 4) is to be inserted into a customer's order, the insert instruction needs to include the order number, which is a "key" value that identifies a particular order (i.e. invoice) into which the new Detail item is to be inserted. This is because Detail data items do not have an independent existence; they are structures that are used to embed data into entities above it in the hierarchy, such as a table that embeds a Detail item.

Accordingly, an operation such as an insert requires enough information, not only to fill out the data in the Detail data item, but also to identify the table and the row in the table into which the data item is to be inserted. During the insert operation, the information identifying the specific order (in the Orders table, as identified by an object identifier) is utilized for the insertion operation. If no specific order number is found, a new order number is created, so as to provide a "place" in which the new Detail item is to be placed (embedded). It will therefore be appreciated that step 1424 involves an identification of the key information needed to conduct the data update command being interpreted, which is employed in the steps of FIG. 15 for carrying out the operation. This information is returned from the operation of routine 1400.

Returning to inquiry 1422, if the item is not a table, the "no" branch is take to step 1426 where the inquiry is made whether the current operation is an insert operation.

It should be understood at this juncture that some data update commands can be applied to user defined types, while some commands cannot. All commands, however, can be applied to tables and embedded tables. An important example is that of the "insert" command. One cannot insert into a UDT, because any given UDT could be employed in any number of different tables and there is no mechanism to determine where to do the insert. Therefore, an insert operation is illegal for a UDT, but updates and deletes are permitted for UDTs.

Therefore, at step 1426 if the operation is an insert, the "yes" branch is taken to step 1428 and an error condition is returned. If the operation is not an insert, the "no" branch is taken and the routine 1400 returns.

Returning to step 1420, if a data update command is not involved, the "no" branch is taken to step 1435 where the inquiry is made whether the command is a legal query. If not, the "no" branch is taken to step 1437, where an error condition is indicated (all possible valid commands have been tested) and the routine 1400 returns with an error condition.

If a legal query is detected at step 1435, the "yes" branch is taken to step 1441, which invokes the routine 1600 for identifying the table or UDT involved with the command. This involves examination of the SELECT statement and determination of the table and/or UDT involved. From step 1441, control passes to step 1443 to determine whether the subject of the command is a table. If the subject of the command is a table, the "yes" branch is taken and the routine 1400 returns.

If the subject of the command is not a table, the "no" branch is taken to step 1445. Here, the item is tested to determine if it is UDT. If not, an error condition is indicated, and control passes to step 1437 and the error condition is returned. If the item is UDT, the "yes" branch is taken to step 1450, where the inquiry is made whether the query includes an "IN" clause. If there is an "IN" clause in the query, the "yes" branch is taken to step 1452, and a list of tables (including any embedded names) is built as return values. If there is no "IN" clause, the "no" branch is taken to step 1455 and a list of all tables (including any embedded names) in the database is returned. The routine 1400 then returns.

Figure 16:
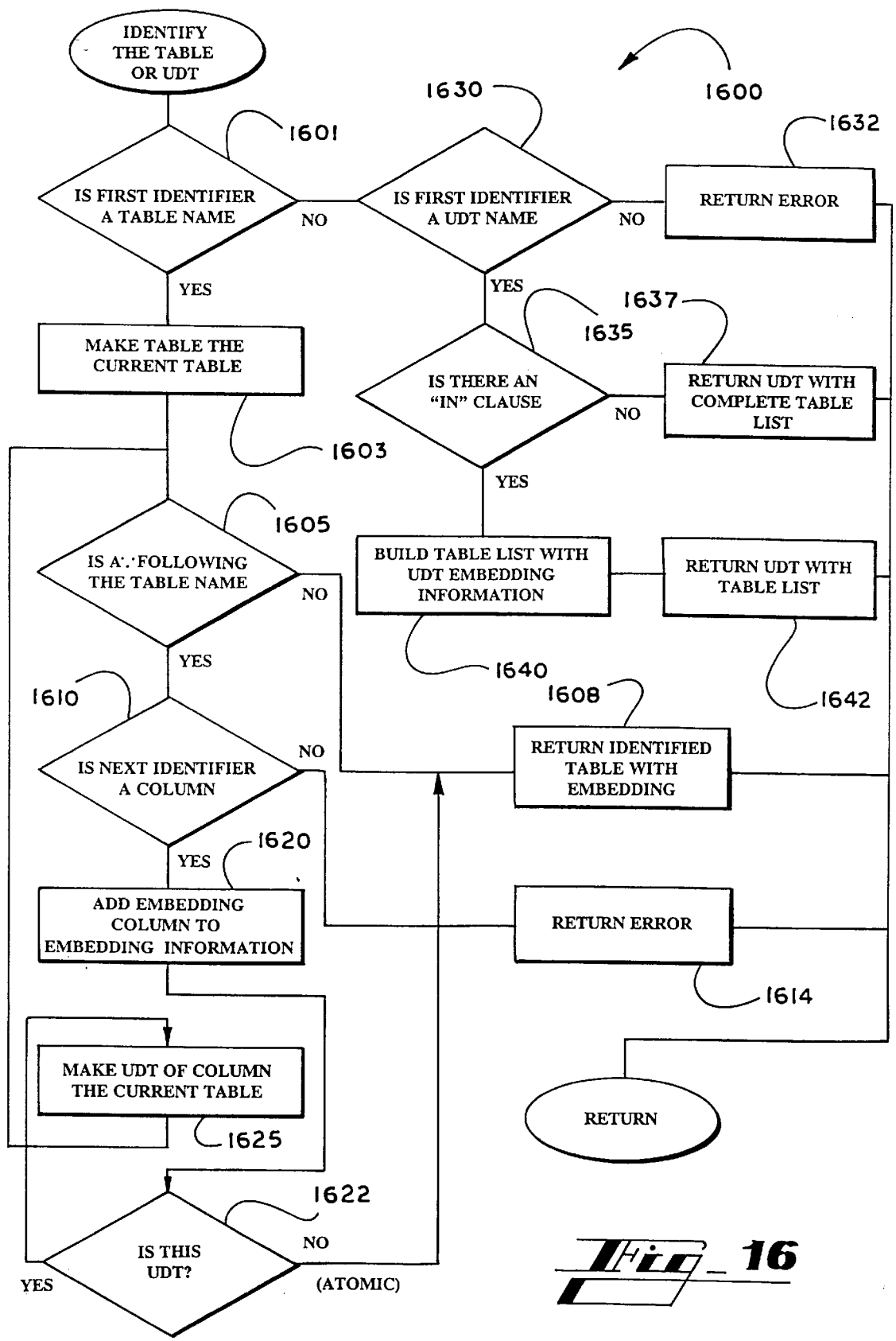
FIG. 16 is a logic flow diagram of a routine within the method described in connection with FIG. 12.

Turn next to FIG. 16 for a discussion of the routine 1600 that is operative for identifying a table or UDT within the routine 1400. This routine involves the process of examining a command, which may include dot separators (•), and returning the identification of any tables or UDTs.

The first step taken at 1601 is to examine the first identifier or word in the command string to determine whether it is a table name. This is effected by reference to the dictionary, such as shown in FIG. 9. If so, the "yes" branch is taken to step 1603 and the table represented by the word is made the current table. (This could be a straight table name or an embedded table.) Control passes to step 1605, and the inquiry is made whether a dot operator (•) follows the table name. If not, the "no" branch is taken to step 1608, and the identified table is returned as a return value and the routine 1600 exits.

If at 1605 a dot operator is found, the "yes" branch is taken to step 1610, where the inquiry is made whether the next identifier in the command string is a column identifier. Again, this is effected by reference to the dictionary. If the next identifier is not a column, the "no" branch is taken as an error condition has been detected. Control passes to step 1614 and an error message is returned as the routine 1600 exits.

If at 1610 the next identifier is a column, the "yes" branch is taken to step 1620. At this step, the identified column is added to a list of information indicative of embedding information, inasmuch as we now have at least a table identified and at least one column identified as embedded within the table. Control passes to step 1622, where the inquiry is made whether the identified column is an embedded UDT.

If at 1622 the column is not a UDT, it is therefore an atomic data value. The "no" branch is taken in this case to step 1608 where the identified table and embedding information is returned as the routine 1600 exits.

If at 1622 the column is a UDT, the "yes" branch is taken to step 1625 which indicates that a UDT is embedded. The type of the UDT is now made as the "current table" entry, and control passes to step 1605 to inquire whether there are more embedded items (i.e. more operands and dot operators). The loop continues iteratively until an exit condition is satisfied, causing routine 1600 to exit returning identified tables with embedding information. The returned data comprises a list of tables with information indicating the information that is embedded in the tables.

Return now to step 1601 for handling the case where the first identifier in the command string is not a table name. If it is not, the "no" branch is taken to step 1630, where the inquiry is made whether the first identifier is a UDT. If not, the "no" branch is taken to step 1632 where an error condition is indicated and returned as the routine 1600 exits.

If the first identifier at step 1630 is a UDT, the "yes" branch is taken to step 1635, where the inquiry is made whether there is an "IN" clause in the command string. If there is no "IN" clause, the "no" branch is taken to step 1637 and a complete list of all tables including the specified UDT is returned (since no limitation on tables was specified via the "IN" clause). If there is an "IN" clause, the "yes" branch is taken to step 1640, where a table list is built that contains UDT embedding information from the tables identified with the "IN" clause. This list is built by reference to the dictionary to identify all tables containing the identified UDT as embedded in such tables. Control passes to step 1642 and the list of tables that are embedded with this particular type UDT is returned as the routine 1600 exits.

Figure 15:
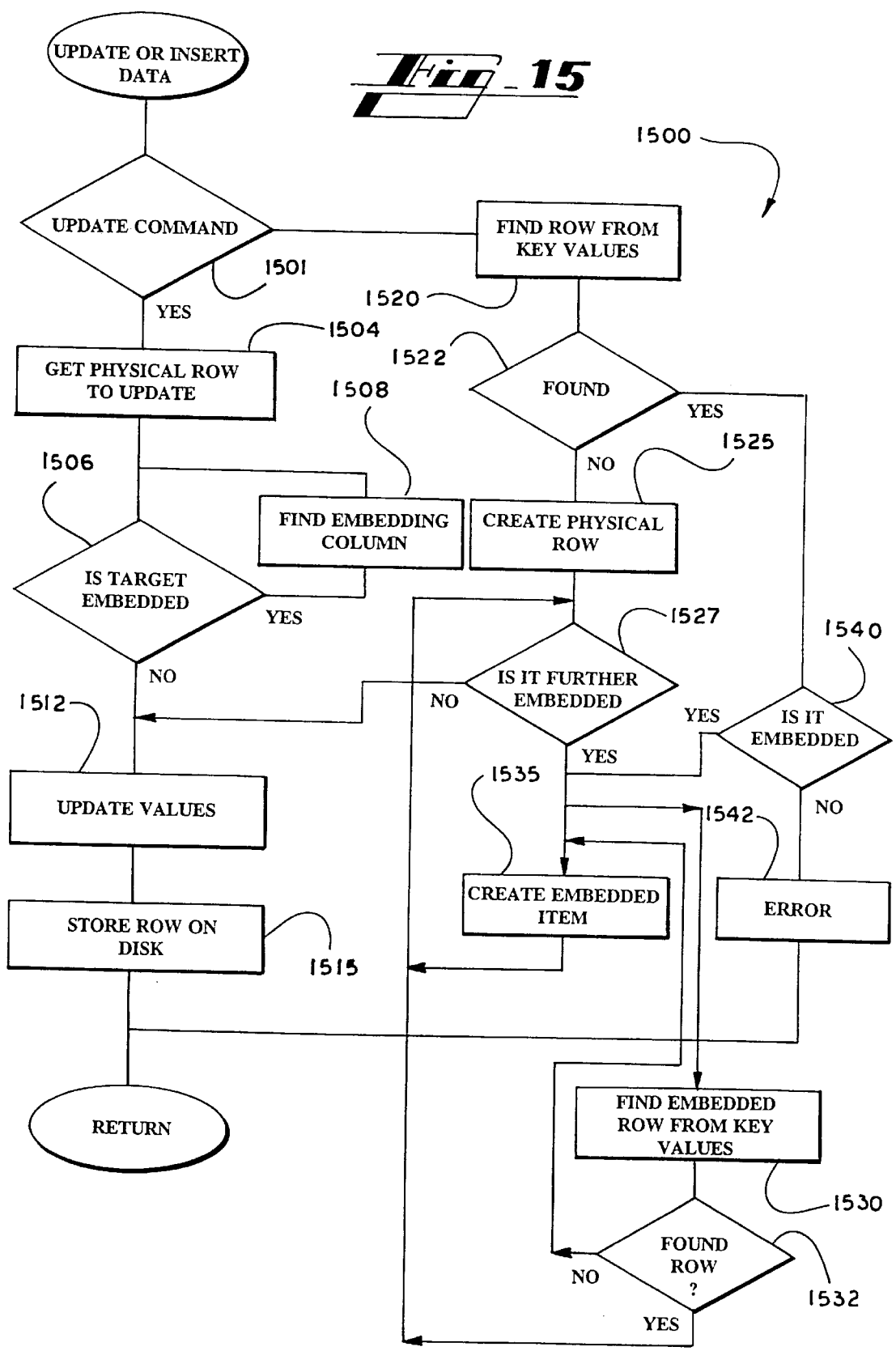
FIG. 15 is a logic flow diagram of a routine within the method described in connection with FIG. 12.

Turn now to FIG. 15 for explanation of the routine 1500 for conducting an update or insert data operation on the database, in response to an update or insert command. It will be noted at this juncture that the logic for a delete command follows essentially the same logic, except is simpler since data values are discarded rather than stored. The update and delete cases follow similar paths.

Beginning at step 1501, the first step taken is to determine if the command is an update command. If so, the "yes" branch is taken to step 1504 which involves finding the physical row that is to be updated. After this operation, a check is made at step 1506 whether target data to be updated is embedded within a table. If so, the "yes" branch is taken to step 1508 where the embedding column is found, and control passes back to step 1506. This loop continues until the last level of embedding is reached, at which point the actual data item can now be stored. At this point, the "yes" branch is taken to step 1512 where the data values are actually updated in the row, and then at step 1515 the row is physically stored to disk. The routine 1500 then returns.

Return now to step 1501 for handling an insert command, which results from taking the "no" branch from this step. Control passes to step 1520, where the key values (obtained from routine 1400) are employed to obtain the relevant row from the subject table. Control passes to step 1522, where the inquiry is made whether the relevant row is present in the table. If not, the "no" branch is taken to step 1525 and a new physical row is created within the current table. Next, an embedding loop is executed, starting at step 1527.

At 1527, the inquiry is made whether there are further levels of embedding involved. If not, the "no" branch is taken from 1527 to step 1512 and the values are updated. If there are further levels of embedding, the "yes" branch is taken from 1527 to step 1530, where the embedded row is obtained from key values (from routine 1400). Control passes to step 1532, where the inquiry is made whether a row can be found from the key values. If so, the "yes" branch is taken back to step 1527 to inquire for further embedding. If no embedded row can be found at step 1532, the "no" branch is taken to step 1535 where an embedded item is created. Control then loops back to 1527 to test for further embedding.

It will be appreciated that the foregoing steps are effective to create an empty row to store actual data values, since the insert operation requires a row for this purpose and no row was found at 1522. Returning to 1522 in this regard, if a row was found for the insertion operation, the "yes" branch is taken to step 1540. At this step, the inquiry is made whether the target row is embedded. If not, an error condition is indicated and control passes to step 1542 for return of an error condition. If the target row is embedded, the "yes" branch is taken to 1530 and the steps associated with this loop are carried out until the appropriate row is found or created and the tests at steps 1532 and 1527 cause the embedding loop to exit.

Turn next to FIG. 17 for a discussion of the routine 1700 for finding and retrieving data from rows in an identified table, typically resulting from interpretation of a query as the database command from routine 1400 in FIG. 12. It will be appreciated that the data could be embedded, it could be within a UDT, or it could be within a physical table only. Ultimately, the data must be within a physical table somewhere, so the ultimate objective of this routine is to identify a physical data row and return a result set with the data from the physical row.

Starting at step 1701, the inquiry is made whether the subject of the retrieval is within an embedded table. If not, the "no" branch is taken to 1703, where the inquiry is made whether the data is within a physical row. If not, the "no" branch is taken to step 1705 where the inquiry is made whether the data is within a UDT. Ultimately, a "yes" is required from the inquiry 1703, since the goal of routine 1700 is to return data from a physical row.

At inquiry 1703, if the data is identified within a physical row, the "yes" branch is taken to 1710, where the physical row is retrieved from memory. The row is tested at step 1712 to verify that this row meets the command criteria (e.g. with WHERE or other conditional clauses). If the row does not meet the criteria at 1712, the "no" branch is taken to step 1715 where the inquiry is made whether there are further rows remaining to be examined. If at 1712 the row meets the inclusion criteria, the "yes" branch is taken to 1718 and the row is added to a result set created for return by the routine 1700. Control passes to inquiry 1715.

If at 1715 more rows are to be examined, control loops back to step 1710 and the next row is retrieved and examined. If at 1715 no further rows remain, the routine exits, providing a result set comprising identified data rows.

Returning now to step 1701, in the case of embedded tables, the "yes" branch is taken to step 1720. At this step, the physical table is retrieved, and at step 1722 the routine 1700 is recursively called. After return of the recursively-called routine 1700 at this level, control passes to step 1724, where the physical rows returned are examined. To begin with, the inquiry is made whether there are further rows to be retrieved. If not, the "no" branch is taken and the routine 1700 returns. If there are further rows to be retrieved, the "yes" branch is taken to step 1727. At this step, the physical rows are retrieved, and at step 1729 a nested column within the physical row is retrieved (a nested column will be present since the embedded table case is being handled). Control passes to step 1732.

At step 1732, the inquiry is made whether there are any nested collection elements. If not, the "no" branch is taken back up to step 1724. If there are nested collection elements, the "yes" branch is taken to 1736. At 1736, the row is tested for inclusion in the results set. If the row meets the test criteria, the row is added to the results set at 1740, and control passes back to 1732 to test for more nested collection elements.

When there are no more nested collection elements, the "no" branch is taken from 1732 and control returns to 1724 to test for the existence of more physical rows. This loop repeats until the test at 1724 results in no more physical rows, and the result set is returned as the routine 1700 exits.

Return now to step 1705 for discussion of the handling of the case where the data is within a user defined type (UDT). It will be understood that query by type will reach this point in the method, as provided by a call to routine 1600 when the command is interpreted. At inquiry 1705, if the row is not within a UDT at this point, an error condition is indicated. The "no" branch is then taken and the routine 1700 exits by returning an error message.

If at 1705 the data is within a UDT, the "yes" branch is taken to step 1750. Beginning at step 1750, each of the embedded tables in the embedded table list will be used to retrieve embedded rows containing the UDT. Starting at step 1750, the next entry in a UDT embedded table list (as provided from 1640 in FIG. 16) is obtained. This next entry is then passed to an iterative call of routine 1700, shown at step 1752. Upon return of the call to routine 1700, control passes to 1755, where the inquiry is made whether there are further entries in the UDT embedded table list. If not, the "no" branch is taken and the routine 1700 exits with a return result set. If there are further entries in the UDT embedded table list, the "yes" branch is taken from back up to step 1750. These steps repeat until the routine 1700 exits.

It will be appreciated now that the results of the "yes" branch of step 1705 is to locate all of the occurrences of a particular user defined type.

Effects of Storage Model on Performance

The advantage of a conventional flat data storage model is that a database engine can read and write rows with minimal CPU cycles, merely by computing offsets to the desired data within a given row. In a system constructed in accordance with the present invention, in order to access any given row, the database engine must:

1. Access the lookup table to determine column identifiers.
2. Parse the row to determine which columns have values.
3. Create an in-memory data structure that represents the contents of that particular row.
4. Scan the row for appropriate column values.

Those skilled in the art will understand that the extra steps that are required in systems constructed as described herein require more CPU cycles than implementations that employ fixed-length data records. It might be expected that the extra CPU cycles make systems constructed in this manner slower, but the inventors have determined that this is not the case. The parsing and scanning overhead is offset by several factors:

1. CPU speed has dramatically increased in present-day computers, eclipsing disk speed. Accordingly, even though extra CPU cycles are required for systems employing the invention, these cycles are relatively insignificant compared with much slower disk-access times.
2. Furthermore, in many database applications, data is not especially dense. As a result, the sparse, variable-length rows are typically much smaller than flat, dense, fixed-length representations. Therefore, more rows of data will fit on each disk page, which improves effective disk input/output and memory cache efficiency.
3. The reading of all data related to a row, which is possible with a single read operation, is substantially faster than the multiple reads required in a conventional relational database system.

The present invention provides additional advantages in the construction of database systems that are independent of the performance or complex data storage ramifications. The tagged, sparse, variable-length, physical storage model provides additional advantages that the creation of columns is easier, database files are smaller, reorganization upon add, delete, or redefine operations does not require recompiling, and tables with many columns are readily constructed.

Creating columns using the present invention is easier and more robust. A user does not need to predict how long (i.e., the number of characters) each column should be and then be forced to change the column length when the original prediction turns out to be inadequate.

Database files are smaller utilizing the present invention. This is because the system does not store null values, creating rows on disks which are typically much smaller, which correspondingly result in smaller database files.

Furthermore, in the event that columns are added, deleted, or redefined, a user need not reorganize the database. Because there is no predefined offset or location for a column value, as in fixed-length, dense storage models, there is no need to recompile the application code or reorganize the database if a column is added or deleted. If a column is added to the database schema, the system need not resize the row until data is actually stored in a record in the new column.

Furthermore, if a user deletes a column, the table need not be compacted. Values in the deleted column, if any, are removed from rows as the rows are updated. If a column's data type is changed, the system can perform type conversion as rows are updated. These foregoing operations are possible without any versioning, so a user need not maintain complicated legacy code that converts version 1.0 data to 1.1 to 1.2 to 2.0 to 2.1 etc. for the life of the database.

A system constructed in accordance with the invention can support tables with hundreds of columns without penalty. Many database applications have sparse data that is ill-suited to traditional fixed-length columns. A classic example is a medical database application that must store a value for test data for each different medical patient. The user may have hundreds of tests that can be applied, but each patient is only given a few tests.

If a traditional database was employed in the medical database application having fixed-length columns, a user has two choices: (1) The user can create a lot of separate tables for the test results, which complicates the database schema and requires many join operations to retrieve test results. (2) Alternatively, the user can create a single table with a column for each test, which makes for very large rows that only contain small amounts of data.

With a system constructed in accordance as described herein, a user adds all the necessary columns to a single table in the schema. When the user stores data in the table, each row only needs to contain information on the particular test the patient received. Tests that are not applied do not result in storage of any information, even null values; only the lookup table need contain all of the test labels and types. Therefore, if a test was not administered to a patient, nothing is saved for the corresponding column.

Finally, it will be understood that the preferred embodiment has been disclosed by way of example, and that other modifications may occur to those skilled in the art without departing from the scope and spirit of the appended claims.

What is claimed is:

1. A method for storing and accessing information in an object-relational database stored in a computer system, the object-relational database comprising one or more tables, the tables each having a table name and comprising one or more rows of information, the method comprising the computer-implemented steps of:

storing a plurality of data elements in a row of information, the row comprising one or more columns, the columns each having a column name, at least one of the columns being an embedded-data column for storing a plurality of the data elements;

receiving a database command for accessing a selected data element, the database command comprising a selected table name and an extension corresponding to a selected column name representing the embedded-data column; and in response to receiving the database command, accessing a table represented by the selected table name;

in response to accessing the table, accessing the embedded-data column represented by the selected column name; and in response to accessing the embedded-data column, accessing the selected data element, whereby a plurality of data elements may be stored in the embedded-data column and, by way of the extension to the database command, may subsequently be accessed from the embedded-data column as if the embedded-data column were a separate table.

2. The method of claim 1, wherein the database command is received in a format generally defined as "TableName.ColumnName".

3. The method of claim 1, wherein the database command may be in any clause of a standard SQL statement.

4. The method of claim 1, wherein the object-relational database further comprises a dictionary;

wherein the dictionary comprises table names and column names; and wherein the method further comprises the step of, in response to receiving the database command, accessing the dictionary to associate the selected column name with selected table name.

5. The method of claim 1, wherein accessing the embedded-data column represented by the selected column name comprises the steps of:

retrieving a row of information from a physical memory storage device in the computer system;

storing the retrieved row of information in a memory device in the computer system;

parsing the retrieved row of information stored in the memory device to determine which columns have data elements; and creating an in-memory data structure that represents the contents of the retrieved row of information.

6. The method of claim 5 wherein accessing the selected data element comprises traversing the in-memory data structure to access the selected data element in the embedded-data column.

7. The method of claim 1, wherein each of the columns further comprise a column data type identifier being selected from the group consisting of an atomic value column data type identifier and an embedded-data column data type identifier, the atomic value column data type identifier identifying an atomic value column for storing one of the data elements, and the embedded-data column data type identifier identifying an embedded-data column for storing a further embedded-data column or an additional atomic value column.

8. The method of claim 7, wherein the atomic value column data type identifier indicates that the identified atomic value column stores a single data element.

9. The method of claim 8, wherein the single data element is delimited by at least one atomic value delimiter character.

10. The method of claim 7, wherein an embedded-data column data type identifier indicates that the identified embedded-data column stores a collection of data elements.

11. The method of claim 10, wherein the collection of data elements is delimited by at least one atomic value delimiter character.

12. The method of claim 7, wherein an embedded-data column data type identifier indicates that the identified embedded-data column stores a structure of data elements, the structure of data elements having a corresponding column name and comprising one or more subrows of information, the subrows of information each comprising one or more subcolumns, the subcolumns each having an associated subcolumn name and comprising one or more data elements.

13. The method of claim 12, wherein the structure of data elements is delimited by at least one predetermined structure delimiter character.

14. The method of claim 12, further comprising the step of automatically assigning a unique row identifier to each row in any table or structure.

15. The method of claim 14, further comprising the step of relating a first table to a second table by storing as a data element in the second table the row identifier associated with a selected row in the first table.

16. The method of claim 15, wherein a reference in the first table to data elements in the second table is made by storing the row identifier of a data element from the second table as a data element in a column in the first table.

17. The method of claim 16, wherein an embedded-data column in the first table stores a collection of data elements comprising a plurality of object identifiers of data elements from the second table.

18. The method of claim 1, wherein each row of information in the table is identified by a row identifier and delimited by at least one predetermined row delimiter character.

19. The method of claim 1, wherein each column is delimited by at least one predetermined column delimiter character.

20. A computer-readable medium having stored thereon computer-executable instructions for performing the method steps of claim 1.

21. A method for accessing a selected data element stored in an object-relational database stored in a computer system, the object-relational database comprising one or more tables, the tables each having a table name and comprising one or more rows of information, the rows of information each having a row identifier and comprising one or more columns, the columns each having a column name and comprising embedded-data elements or atomic data elements, the method comprising the computer-implemented steps of:

receiving a database command for accessing a selected data element, the command comprising at least a table name and an extension corresponding to a column name, the column name representing an embedded-data column for storing embedded data elements;

in response to receiving the database command, accessing a table represented by the table name;

in response to accessing the table, accessing the embedded-data column represented by the column name in the database command; and in response to accessing the embedded-data column, accessing the selected data element.

22. The method of claim 21, wherein the object-relational database further comprises a dictionary;

wherein the dictionary comprises table names and column names; and where the method further comprises the step of, in response to receiving the database command, accessing the dictionary to associate column names with table names.

23. The method of claim 21, wherein the database command is received in a format generally defined as "TableName.ColumnName".

24. The method of claim 21, wherein the database command may be in any clause of a standard SQL statement.

25. The method of claim 21, wherein the embedded-data elements comprise a collection, the collection comprising a plurality of atomic data elements or structures of data elements.

26. The method of claim 21, wherein the embedded-data elements comprise a structure, the structure having a corresponding column name and comprising one or more subrows of information, the subrows of information each having a row identifier and comprising one or more subcolumns, the subcolumns each having an associated column name and comprising embedded-data elements or atomic data elements.

27. The method of claim 21, wherein accessing the embedded-data column comprises the steps of:

retrieving a row of information from a physical memory storage device in the computer system;

storing the retrieved row of information in a memory device in the computer system;

parsing the retrieved row of information stored in the memory device to determine which columns have data elements; and creating an in-memory data structure that represents the contents of the retrieved row of information.

28. The method of claim 27 wherein accessing the selected data element comprises traversing the in-memory data structure to access the selected data element in the embedded-data column.

29. The method of claim 21, wherein the database command further comprises a second extension corresponding to a second column name representing a second embedded-data column, the second embedded-data column being embedded within the embedded-data column; and wherein the method comprises:

in response to receiving the database command, accessing the table corresponding to the table name, in response to accessing the table, accessing the embedded-data column represented by the column name in the database command, in response to accessing the embedded-data column, accessing the second embedded-data column represented by the second column name in the database command, and in response to accessing the second embedded-data column, accessing the selected data element.

30. The method of claim 21, wherein the database command may comprise an unlimited number of extensions, each representing a more deeply nested embedded-data column.

31. A computer-readable medium having stored thereon computer-executable instructions for performing the method steps of claim 21.

32. A method for storing and accessing a user defined type of data (UDT) in an object-relational database stored in a computer system, the object-relational database comprising one or more tables, the tables each comprising a table name and one or more rows, the rows each comprising one or more embedded data columns, the embedded data columns each having a type name and comprising a plurality of data elements, the method comprising the steps of:

storing a UDT in one or more selected tables, the UDT being stored in an embedded-data column in each of the selected tables, a UDT-name being the type name for the embedded-data column in each of the selected tables;

receiving a database command for accessing a selected data element, the database command comprising at least the UDT name;

in response to receiving the database command, searching every table in the object-relational database to identify the selected tables storing the UDT;

in response to identifying the selected tables, accessing each of the selected tables to identify an associated type name associated with the UDT name;

in each of the selected tables, in response to identifying the associated type name, accessing the embedded-data column corresponding to the UDT name; and in each of the selected tables, in response to accessing the embedded data column, accessing the selected data element, whereby a UDT may be stored in selected tables in the object-relational database and subsequently accessed without specifying the table names for the selected tables in the database command.

33. The method of claim 32, wherein the object-relational database further comprises a dictionary;

wherein the dictionary comprises table names and type names; and wherein the method further comprises the step of, in response to receiving the database command, accessing the dictionary to associate the UDT name with table names.

34. The method of claim 32, wherein the database command comprises a UDT name and one or more selected table names; and wherein the method further comprises, in response to receiving the database command, searching only the tables in the object-relational database corresponding to the selected table names.

35. The method of claim 32, wherein accessing the embedded-data column comprises the steps of:

retrieving a row of information from a physical memory storage device in the computer system;

storing the retrieved row of information in a (random access) memory device in the computer system;

parsing the retrieved row of information stored in the (random access) memory device to determine which columns have data elements; and creating an in-memory data structure that represents the contents of the retrieved row of information.

36. The method of claim 35, wherein accessing the selected data element comprises traversing the in-memory data structure to access the selected data element in the embedded-data column.

37. A computer-readable medium having stored thereon computer-executable instructions for performing the method steps of claim 32.

38. A system for storing and accessing information in an object-relational database, the object-relational database comprising one or more tables, the tables each having a table name and comprising one or more rows of information, the rows of information each comprising one or more columns of data elements, the system comprising:

a memory device for storing a plurality of data elements in a row of information, the row comprising a plurality of columns, the columns each having a column name and comprising at least one of the data elements;

a dictionary comprising table names and column names;

a processor (CPU) for receiving a database command for accessing a selected data element, the database command comprising a selected table name and an extension corresponding to a selected column name, the selected column name corresponding to an embedded-data column, the embedded-data column being one of the columns operative for storing a plurality of the data elements; and in response to receiving the database command, the processor being operative to:

access the dictionary to associate the selected column name and the selected table name with a corresponding table and a corresponding embedded-data column, access the corresponding table corresponding to the selected table name, in response to accessing the corresponding table, accessing the embedded-data column corresponding to the selected column name, in response to accessing the embedded-data column, accessing the selected data element, whereby a plurality of data elements may be stored in a single embedded-data column of an object relational database and, by way of an extension to a database command, may subsequently be accessed from the embedded data column as if the embedded-data column were a table.

39. A system for storing and accessing a user defined type of data (UDT) in an object-relational database stored in a computer system, the object-relational database comprising one or more tables, the tables each comprising a table name and one or more rows, the rows each comprising one or more embedded data columns, the embedded data columns each having an column name and comprising a plurality of data elements, the system comprising:

a memory device for storing a UDT in one or more selected tables, the UDT being stored in an embedded-data column in each of the selected tables, a UDT-name being the type name for the embedded-data column in each of the selected tables;

a dictionary comprising type names and table names;

a processor for receiving a database command for accessing a selected data element, the database command comprising at least the UDT name; and in response to receiving the database command, the processor being operative to:

access the dictionary to identify the selected tables storing the UDT, in response to identifying the selected tables, access each of the selected tables to identify an associated type name associated with the UDT name, in each of the selected tables, in response to identifying the associated type name, access the embedded-data column corresponding to the UDT name, and in each of the selected tables, in response to accessing the embedded data column, access the selected data element, whereby a UDT may be stored in selected tables in the object-relational database and subsequently accessed without specifying the table names for the selected tables in the database command.

* * * * *